(12) United States Patent  
Cohen et al.

(10) Patent No.: US 9,395,924 B2
(45) Date of Patent: Jul. 19, 2016

(54) MANAGEMENT OF AND REGION SELECTION FOR WRITES TO NON-VOLATILE MEMORY

(71) Applicant: Seagate Technology LLC, Cupertino, CA (US)

(72) Inventors: Earl T Cohen, Oakland, CA (US); Timothy Lawrence Canepa, Los Gatos, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/158,827

(22) Filed: Jan. 19, 2014

(65) Prior Publication Data

US 2014/0208007 A1   Jul. 24, 2014

Related U.S. Application Data

(60) Provisional application No. 61/755,442, filed on Jan. 22, 2013.

(51) Int. Cl.
*G06F 3/06* (2006.01)
*G06F 12/02* (2006.01)

(52) U.S. Cl.
CPC .............. *G06F 3/0619* (2013.01); *G06F 3/064* (2013.01); *G06F 3/0608* (2013.01); *G06F 3/0616* (2013.01); *G06F 3/0653* (2013.01); *G06F 3/0679* (2013.01); *G06F 12/0246* (2013.01); *G06F 2212/1016* (2013.01);
(Continued)

(58) Field of Classification Search
None
See application file for complete search history.

(56) References Cited

U.S. PATENT DOCUMENTS 4,942,552 A   7/1990 Merrill et al.
5,553,261 A * 9/1996 Hasbun ................. G06F 3/0601
                                                                 711/103

(Continued)

FOREIGN PATENT DOCUMENTS

CN   1670701 A   9/2005
CN   1851671 A   10/2006

(Continued)

OTHER PUBLICATIONS

'Using the Appropriate Wear Leveling to Extend Product Lifespan' Presented by: Bill Roman, Datalight Software Architect, Aug. 2009.*

(Continued)

*Primary Examiner* — Steven Snyder
(74) *Attorney, Agent, or Firm* — Cesari & Reed, LLP; Kirk A. Cesari

(57) ABSTRACT

Management of and region selection for writes to non-volatile memory of an SSD improves performance, reliability, unit cost, and/or development cost of an SSD. A controller receives and determines characteristics of writes (e.g. by analyzing the write data, the write data source, and/or by receiving a hint) and selects a region based on the determined characteristics and properties of regions of non-volatile memory. For example, a controller receives writes determined to be read-only data and selects regions of non-volatile memory containing cells that are likely to have write failures. By placing read-only data in write failure prone regions, the likelihood of an error is reduced, thus improving reliability. As another example, a controller receives writes hinted to be uncompressible and selects regions of non-volatile memory containing uncompressible data.

20 Claims, 9 Drawing Sheets

(52) U.S. Cl.
CPC ............... *G06F 2212/1044* (2013.01); *G06F 2212/7201* (2013.01); *G06F 2212/7202* (2013.01); *G06F 2212/7208* (2013.01); *G06F 2212/7211* (2013.01)

(56) References Cited

U.S. PATENT DOCUMENTS

| | | | | |
|---|---|---|---|---|
| 5,568,626 | A * | 10/1996 | Takizawa | G11C 16/102 711/103 |
| 6,269,413 | B1 * | 7/2001 | Sherlock | G06F 3/0608 710/29 |
| 6,279,057 | B1 * | 8/2001 | Westby | G06F 3/0619 710/52 |
| 6,427,198 | B1 | 7/2002 | Berglund et al. | |
| 6,763,424 | B2 | 7/2004 | Conley | |
| 7,017,004 | B1 * | 3/2006 | Calligaro et al. | 711/102 |
| 7,159,082 | B1 | 1/2007 | Wade | |
| 7,594,073 | B2 | 9/2009 | Hanebutte | |
| 7,797,481 | B2 * | 9/2010 | Lee et al. | 711/103 |
| 8,327,226 | B2 | 12/2012 | Rub | |
| 8,479,080 | B1 | 7/2013 | Shalvi et al. | |
| 8,677,054 | B1 | 3/2014 | Meir et al. | |
| 8,745,319 | B2 * | 6/2014 | Langlois et al. | 711/103 |
| 2003/0055988 | A1 | 3/2003 | Noma et al. | |
| 2004/0085817 | A1 * | 5/2004 | Kim et al. | 365/189.01 |
| 2004/0250026 | A1 | 12/2004 | Tanoue | |
| 2005/0033937 | A1 * | 2/2005 | Shibuya et al. | 711/170 |
| 2006/0174067 | A1 | 8/2006 | Soules | |
| 2007/0106844 | A1 * | 5/2007 | Ohkawa | 711/130 |
| 2007/0162601 | A1 | 7/2007 | Pendarakis et al. | |
| 2007/0198799 | A1 | 8/2007 | Shinohara et al. | |
| 2008/0320190 | A1 | 12/2008 | Lydon et al. | |
| 2009/0089489 | A1 * | 4/2009 | Mukaida et al. | 711/103 |
| 2009/0193164 | A1 | 7/2009 | Ajanovic et al. | |
| 2009/0249022 | A1 | 10/2009 | Rowe et al. | |
| 2009/0287861 | A1 | 11/2009 | Lipps et al. | |
| 2010/0011154 | A1 * | 1/2010 | Yeh | 711/103 |
| 2010/0037003 | A1 | 2/2010 | Chen et al. | |
| 2010/0131702 | A1 | 5/2010 | Wong et al. | |
| 2010/0153631 | A1 | 6/2010 | Moon et al. | |
| 2010/0169710 | A1 | 7/2010 | Royer | |
| 2010/0174866 | A1 | 7/2010 | Fujimoto et al. | |
| 2011/0010489 | A1 | 1/2011 | Yeh | |
| 2011/0060861 | A1 * | 3/2011 | Warren | 711/103 |
| 2011/0099323 | A1 | 4/2011 | Syu | |
| 2011/0145486 | A1 * | 6/2011 | Owa et al. | 711/103 |
| 2011/0238890 | A1 | 9/2011 | Sukegawa | |
| 2011/0258363 | A1 * | 10/2011 | Doatmas | G06F 3/0616 711/103 |
| 2011/0264843 | A1 | 10/2011 | Haines et al. | |
| 2012/0054419 | A1 | 3/2012 | Chen et al. | |
| 2012/0059976 | A1 | 3/2012 | Rosenband et al. | |
| 2012/0117309 | A1 | 5/2012 | Schuette | |
| 2012/0284587 | A1 * | 11/2012 | Yu | G06F 3/0608 714/773 |
| 2012/0311232 | A1 * | 12/2012 | Porterfield | G11C 16/3495 711/103 |
| 2013/0061101 | A1 * | 3/2013 | Fitzpatrick | G11C 29/50004 714/718 |
| 2013/0297894 | A1 | 11/2013 | Cohen et al. | |
| 2014/0082261 | A1 | 3/2014 | Cohen et al. | |
| 2014/0089582 | A1 * | 3/2014 | Kobayashi | G06F 3/0614 711/114 |
| 2014/0101379 | A1 | 4/2014 | Tomlin | |
| 2014/0122774 | A1 * | 5/2014 | Xian et al. | 711/103 |
| 2014/0136752 | A1 * | 5/2014 | Terada | 711/102 |
| 2014/0181327 | A1 | 6/2014 | Cohen et al. | |
| 2014/0208007 | A1 | 7/2014 | Cohen et al. | |
| 2014/0223094 | A1 * | 8/2014 | Baderdinni et al. | 711/114 |
| 2014/0281687 | A1 * | 9/2014 | Vogan et al. | 714/6.13 |
| 2015/0206584 | A1 * | 7/2015 | Tsai | G11C 13/0035 711/103 |

FOREIGN PATENT DOCUMENTS

| | | |
|---|---|---|
| CN | 1924830 A | 3/2007 |
| CN | 101356502 A | 1/2009 |
| CN | 101390043 A | 3/2009 |
| CN | 101576834 A | 11/2009 |
| CN | 101930404 A | 12/2010 |
| CN | 102023818 A | 4/2011 |
| EP | 0898228 | 9/2005 |
| GB | 2479235 A | 10/2011 |
| JP | H07-160602 A | 6/1995 |
| JP | 2007-226557 A | 9/2007 |
| KR | 100445134 | 8/2004 |
| TW | 201007734 A | 2/2010 |
| WO | 2012099937 A2 | 7/2012 |

OTHER PUBLICATIONS

'Error Analysis and Retention-Aware Error Management for NAND Flash Memory' by Yu Cai et al., Intel Technology Journal, vol. 17, Issue 1, 2013.*
'The Inconvenient Truths of NAND Flash Memory' by Jim Cooke, Micron Technology, Inc., Aug. 2007.*
European Search Report in related case 14151725.0, 6 pages.
Office Action of the Intellectual Property Office ROC (Taiwan) Patent Application No. 101128817 including Search Report, Jul. 14, 2014, 17 pages.
European Search Report in EP 14151725.0, 6 pages.
International Search Report and the Writien Opinion for PCT/US12/58583, 10 pages.
CN Office Action (10 pp. English translation and 7 pp. CN original) of Mar. 10, 2014 of CN national entry of PCT/US12/58583, 17 pp. total.
CN Search Report (2 pp. English translation and 2 pp. CN original) of Feb. 28, 2014 of CN national entry of PCT/US12/58583, 4 pp. total.
KR Notice (3 pp. English translation and 4 pp. KR original) of Jun. 27, 2014 of KR national entry of PCT/US12/58583, 7 pp. total.
International Search Report for PCT/US2012/034601, 3 pages.
Written Opinion for PCT/US2012/034601, 4 pages.
Agrawal et al, "Design Tradeoffs for SSD Performance," Proceedings of the 2008 USENIX Annual Technical Conference, Jun. 2008, 14 pages.
Mehling, Herman, "Solid State Drives Get Faster with TRIM," Jan. 27, 2010 (retrieved from http://www.enterprisestorageforum.com/technology/features/article.php/38611 81 /Solid-State-Drives-Get-Faster-with-TRIM.htm and converted to pdf format Apr. 7, 2014), 4 pages.
Layton, Jeffrey, "Anatomy of SSDs," Linux Magazine, Oct. 27, 2009 (Retrieved from http://www.linux-mag.com/id/7590/2 and converted to pdf format Apr. 7, 2014), 4 pages.
Shimpi, Anand Lal, "The Impact of Spare Area on SandForce, More Capacity at No Performance Loss?" May 3, 2010 (retrieved from http://www.anandtech.com/show/3690/the-impact-of-spare-area-on-sandforce-more-capacity-at-no-performance-loss and converted to pdf format Apr. 7, 2014), 14 pages.
Frankie et al, "SSD Trim Commands Considerably Improve Overprovisioning," Proceedings Flash Memory Summit 2011, Aug. 2011, 19 pages.
Smith, Kent, "Garbage Collection: Understanding Foreground vs. Background GC and Other Related Elements," Proceedings Flash Memory Summit 2011, Aug. 2011, 9 pages.
Smith, Kent, "Understanding SSD Over Provisioning," Proceedings Flash Memory Summit 2012, Aug. 2012, 16 pages.
"SSDs-Write Amplification, Trim and GC," Mar. 2010 (retrieved from http://www.oczenterprise.com/whitepapers/ssds-writeamplification-trim-and-gc.pdf, using Internet Archive Wayback Machine Mar. 28, 2014), 3 pages.
"Write Amplification," Wikipedia (retrieved from http://en.wikipedia.org/wiki/Write_amplification and converted to pdf format Apr. 7, 2014), 14 pages.
Dec. 4, 2014 List of References Used in Art Rejections in Cases, 2 p.
Office Action of the State Intellectual Property Office of the People's Republic of China Patent Application No. 2012800314652 including Search Report, May 4, 2014, 14 pages.
International Search Report for PCT/US2012/049905, 4 pages.
The Written Opinion for PCT/US2012/049905, 5 pages.

* cited by examiner

US 9,395,924 B2

MANAGEMENT OF AND REGION SELECTION FOR WRITES TO NON-VOLATILE MEMORY

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

PCT Application (Serial No. PCT/US11/28244), filed Mar. 11, 2011, first named inventor Hao ZHONG, and entitled LDPC ERASURE DECODING FOR FLASH MEMORIES;

PCT Application (Serial No. PCT/US11/57914), filed Oct. 26, 2011, first named inventor Yan LI, and entitled ADAPTIVE ECC TECHNIQUES FOR FLASH MEMORY BASED DATA STORAGE;

PCT Application (Serial No. PCT/US12/21682), filed Jan. 18, 2012, first named inventor Jeremy Isaac Nathaniel WERNER, and entitled HIGHER-LEVEL REDUNDANCY INFORMATION COMPUTATION; and U.S. Provisional Application (Ser. No. 61/755,442), filed Jan. 22, 2013, first named inventor Earl T. COHEN, and entitled MANAGEMENT OF AND REGION SELECTION FOR WRITES TO NON-VOLATILE MEMORY.

BACKGROUND

1. Field

Advancements in storage device technology and manufacturing are needed to provide improvements in cost, profitability, performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

LIST OF REFERENCE SYMBOLS IN DRAWINGS

Figure 1A:
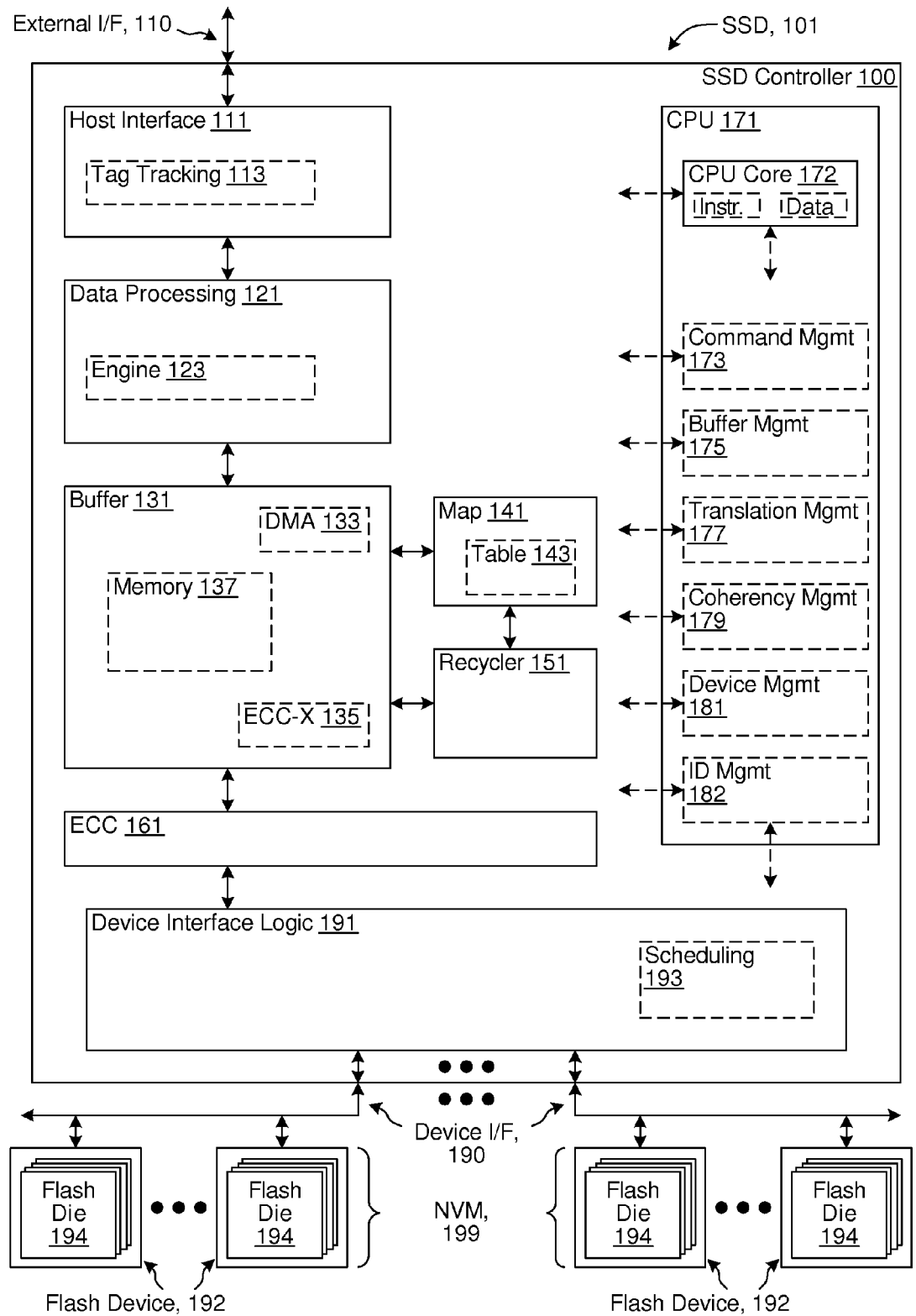
FIG. 1A illustrates selected details of an embodiment of a Solid-State Disk (SSD) including an SSD controller enabled to perform management and region selection of writes to regions of non-volatile memory.

| Ref. Symbol | Element Name |
| --- | --- |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |

-continued

| Ref. Symbol | Element Name |
|---|---|
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 211 | LBA |
| 213 | LPN |
| 215 | Logical Offset |
| 221 | Map Info for LPN |
| 223 | Read Unit Address |
| 225 | Length in Read Units |
| 311 | Read Data |
| 313 | First Read Unit |
| 315 | Last Read Unit |
| 401A | Read Unit |
| 401B | Read Unit |
| 410B | Header Marker (HM) |
| 411A | Header 1 |
| 411B | Header 1 |
| 412B | Header 2 |
| 419A | Header N |
| 419B | Header N |
| 421A | Data Bytes |
| 421B | Data Bytes |
| 422B | Data Bytes |
| 429B | Data Bytes |
| 431A | Optional Padding Bytes |
| 431B | Optional Padding Bytes |
| 501 | Header |
| 511 | Type |
| 513 | Last Indicator |
| 515 | Flags |
| 517 | LPN |
| 519 | Length |
| 521 | Offset |
| 600 | Striping Direction |
| 601, 603, 609 | Devices |
| 610.0, 610.1, 610.61, 610.62, 610.63, 610.64, 610.65 | Flash Die |
| 610.0B0, 610.0B1, 610.0BB, 610.1B0, 610.1B1, 610.1BB, 610.65B0, 610.65B1, 610.65BB | Blocks |
| 610.0P0, 610.0P1, 610.0PP, 610.1P0, 610.1P1, 610.1PP, 610.65P0, 610.65P1, 610.65PP | Pages |
| 610.0R0, 610.0R1, 610.0RR, 610.1R0, 610.1R1, 610.1RR, 610.65R0, 610.65R1, 610.65RR | Read Units (RUs) |
| 660.0, 660.1, 660.R | R-blocks |
| 700 | Write Data Sources |
| 701 | Host Data |
| 702 | Recycled Data |
| 703 | System Data |
| 704 | Other Data |
| 705 | Hint Unit |
| 706 | Source ID |
| 707 | Source Info |
| 708 | Write Data |
| 709 | Hint |
| 710 | Band Management |
| 711 | Map |
| 712 | LBA Counters Array |
| 713 | Data Analysis |
| 714 | Band Selector |
| 715 | Band ID |
| 716 | Write Data |
| 717 | Data Transform |
| 718 | Transformed Data |
| 730 | Data Bands |
| 731, 732, 73N | Bands |
| 731.1, 731.M, 732.1, 732.J, 73N.1, 73N.K | R-blocks |
| 800 | LBA to NVM Location Mapping |
| 810 | FLM |
| 810.1 | SLM Page/Length |
| 810.2 | SLM Page/Length |
| 810.M | SLM Page/Length |
| 810S | SLM Pointer |
| 820 | SLM Page |
| 820.1 | LB Page/Length |
| 820.2 | LB Page/Length |
| 820.N | LB Page/Length |
| 820L | LB Pointer |
| 821 | LBA |
| 822 | Integer Divider |
| 822Q | FLM Index |
| 822R | SLM Page Index |
| 822.1, 822.2, 822.N | LBA Counters |
| 823 | SLM Entries/SLM Page (CSR) |
| 900 | Band Management Flow, Generally |
| 901 | Start |
| 902 | Receive Write Data, Source Info |
| 903 | Analyze Write Data, Source Info |
| 904 | Select Data Band |
| 905 | Assign Data to Band |
| 906 | End |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AHCI | Advanced Host Controller Interface |
| API | Application Program Interface |
| ATA | Advanced Technology Attachment (AT Attachment) |
| BCH | Bose Chaudhuri Hocquenghem |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| FLM | First-Level Map |
| GPS | Global Positioning System |
| HDD | Hard Disk Drive |
| I/O | Input/Output |
| IC | Integrated Circuit |
| IDE | Integrated Drive Electronics |
| JPEG | Joint Photographic Experts Group |
| LAN | Local Area Network |
| LBA | Logical Block Address |

-continued

| Acronym | Description |
|---|---|
| LDPC | Low-Density Parity-Check |
| LPN | Logical Page Number |
| MLC | Multi-Level Cell |
| MMC | MultiMediaCard |
| MPEG | Moving Picture Experts Group |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| POS | Point Of Sale |
| RAID | Redundant Array of Inexpensive/Independent Disks |
| RASIE | Redundant Array of Silicon Independent Elements |
| ReRAM | Resistive Random Access Memory |
| RS | Reed-Solomon |
| SAN | Storage Attached Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLM | Second-Level Map |
| SLC | Single-Level Cell |
| SMART | Self-Monitoring Analysis and Reporting Technology |
| SRAM | Static Random Access Memory |
| SSD | Solid-State Disk/Drive |
| UFS | Unified Flash Storage |
| USB | Universal Serial Bus |
| VF | Virtual Function |
| WAN | Wide Area Network |

In various embodiments, regions (e.g. data bands) are managed groups of blocks of NVMs in an SSD. In the following discussion, "a block has one or more logical properties" is understood to mean "a block is allocated to data projected to have or observed to have one or more logical properties". In various embodiments, blocks have logical properties, physical properties, and/or contain data from one or more write data sources. In various embodiments, bands solely include blocks with a particular combination of specific physical properties, specific logical properties, and/or contain data from specific write data sources.

In various embodiments, bands include blocks with one or more specific logical properties. In various embodiments, the specific logical properties are any one or more of: being frequently read, being relatively more frequently written (e.g., 'hotter' or 'hot'), being more relatively infrequently written (e.g., 'colder' or 'cold'), being uncompressible, being executable, being non-recoverable and necessary to be preserved after a power loss, being recoverable and not necessary to be preserved after a power loss, being encrypted using a specific technique or key, being protected against errors using a specific technique or key or with specific ECC schemes, being subject to recycling, and being not subject to recycling. In various embodiments, first and second bands include blocks allocated to data projected to have or observed to have particular first and second logical properties.

In various embodiments, bands solely include blocks with specific physical properties. As a first example, a band solely includes lower-page blocks. As a second example, a band solely includes upper-page blocks. Other embodiments include bands with blocks with other specific physical properties.

In various embodiments, bands solely include blocks of data solely from a specific write data source. Examples of write data sources include a computing host providing host data, data produced by recycling (such as valid data from a block to be erased), and data produced by system operations performed by, e.g., a controller of an SSD (such as map data).

In various embodiments, managing bands is advantageous and improves one or more of: performance, reliability, unit cost, and development cost of an SSD. For example, blocks containing NVM cells that are likely to have write failures are allocated to a cold band, thus improving reliability. For another example, blocks containing NVM cells configured or alternatively used as SLCs are allocated to system data (e.g. map data).

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
analyzing a write received from a host to determine a characteristic of the write;
selecting one of a plurality of bands of a Non-Volatile Memory (NVM) based at least in part on the characteristic;
writing data of the write to the selected band; and
wherein each of the bands is a managed portion of the NVM.

EC2) The method of EC1, wherein the characteristic comprises data of the write being compressible.

EC3) The method of EC1, wherein the characteristic comprises data of the write being executable.

EC4) The method of EC1, wherein the characteristic is based at least in part on a counter associated with a Logical Block Address (LBA) corresponding to the write.

EC5) The method of EC4, further comprising counting a number of writes to the LBA via the counter.

EC6) The method of EC4, further comprising counting a difference between a number of reads of the LBA and a number of writes of the LBA via the counter.

EC7) The method of EC1, wherein each of the bands comprises one or more R-blocks.

EC8) The method of EC1, wherein each of the bands comprises one or more blocks of the NVM.

EC9) The method of EC1, wherein each of the bands is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC10) The method of EC1, further comprising recycling data from a first one of the bands to a second one of the bands, and wherein the second band contains both data written directly by the host and data recycled from the first band.

EC11) The method of EC1, wherein the write is received from the host via a storage interface compatible with one or more storage interface standards.

EC12) The method of EC1, wherein the writing data is at least in part via a flash memory interface enabled to communicate with the NVM.

EC13) The method of EC1, wherein the NVM comprises at least one flash memory.

EC14) The method of EC1, wherein
the write is received from the host via a storage interface compatible with one or more storage interface standards;
the writing data is at least in part via a flash memory interface enabled to communicate with the NVM;
the NVM comprises at least one flash memory; and
the storage interface and the flash memory interface are comprised in a controller implemented in a single integrated circuit.

EC15) A system comprising:
means for analyzing a write received from a host to determine a characteristic of the write;
means for selecting one of a plurality of bands of a Non-Volatile Memory (NVM) based at least in part on the characteristic;
means for writing data of the write to the selected band; and
wherein each of the bands is a managed portion of the NVM.

EC16) The system of EC15, wherein the characteristic comprises data of the write being compressible.

EC17) The system of EC15, wherein the characteristic comprises data of the write being executable.

EC18) The system of EC15, wherein the characteristic is based, at least in part, on a counter associated with a Logical Block Address (LBA) corresponding to the write.

EC19) The system of EC18, further comprising means for counting a number of writes to the LBA via the counter.

EC20) The system of EC18, further comprising means for counting a difference between a number of reads of the LBA and a number of writes of the LBA via the counter.

EC21) The system of EC15, wherein each of the bands comprises one or more R-blocks.

EC22) The system of EC15, wherein each of the bands comprises one or more blocks of the NVM.

EC23) The system of EC15, wherein each of the bands is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC24) The system of EC15, further comprising means for recycling data from a first one of the bands to a second one of the bands, and wherein the second band contains both data written directly by the host and data recycled from the first band.

EC25) The system of EC15, wherein the write is received from the host via a storage interface compatible with one or more storage interface standards.

EC26) The system of EC15, wherein the means for writing data comprises a flash memory interface enabled to communicate with the NVM.

EC27) The system of EC15, wherein the NVM comprises at least one flash memory.

EC28) The system of EC15, wherein
the write is received from the host via a storage interface compatible with one or more storage interface standards;
the means for writing data comprises a flash memory interface enabled to communicate with the NVM;
the NVM comprises at least one flash memory; and
the storage interface and the flash memory interface are comprised in a controller implemented in a single integrated circuit.

EC29) A tangible computer readable medium having a set of instructions stored therein that when executed by a processing element cause the processing element to perform and/or control operations comprising:
analyzing a write received from a host to determine a characteristic of the write;
selecting one of a plurality of bands of a Non-Volatile Memory (NVM) based at least in part on the characteristic;
writing data of the write to the selected band; and
wherein each of the bands is a managed portion of the NVM.

EC30) The tangible computer readable medium of EC29, wherein the characteristic comprises data of the write being compressible.

EC31) The tangible computer readable medium of EC29, wherein the characteristic comprises data of the write being executable.

EC32) The tangible computer readable medium of EC29, wherein the characteristic is based at least in part on a counter associated with a Logical Block Address (LBA) corresponding to the write.

EC33) The tangible computer readable medium of EC32, wherein the operations further comprise counting a number of writes to the LBA via the counter.

EC34) The tangible computer readable medium of EC32, wherein the operations further comprise counting a difference between a number of reads of the LBA and a number of writes of the LBA via the counter.

EC35) The tangible computer readable medium of EC29, wherein each of the bands comprises one or more R-blocks.

EC36) The tangible computer readable medium of EC29, wherein each of the bands comprises one or more blocks of the NVM.

EC37) The tangible computer readable medium of EC29, wherein each of the bands is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC38) The tangible computer readable medium of EC29, wherein the operations further comprise recycling data from a first one of the bands to a second one of the bands, and wherein the second band contains both data written directly by the host and data recycled from the first band.

EC39) The tangible computer readable medium of EC29, wherein the write is received from the host via a storage interface compatible with one or more storage interface standards.

EC40) The tangible computer readable medium of EC29, wherein the writing data is at least in part via a flash memory interface enabled to communicate with the NVM.

EC41) The tangible computer readable medium of EC29, wherein the NVM comprises at least one flash memory.

EC42) The tangible computer readable medium of EC29, wherein
the write is received from the host via a storage interface compatible with one or more storage interface standards;
the writing data is at least in part via a flash memory interface enabled to communicate with the NVM;
the NVM comprises at least one flash memory; and
the processing element, the storage interface, and the flash memory interface are comprised in a controller implemented in a single integrated circuit.

EC43) An apparatus comprising:
write analysis hardware logic circuitry enabled to analyze a write received from a host to determine a characteristic of the write;
band selection hardware logic circuitry enabled to select one of a plurality of bands of a Non-Volatile Memory (NVM) based at least in part on the characteristic;
memory write hardware logic circuitry enabled to write data of the write to the selected band; and
wherein each of the bands is a managed portion of the NVM.

EC44) The apparatus of EC43, wherein the characteristic comprises data of the write being compressible.

EC45) The apparatus of EC43, wherein the characteristic comprises data of the write being executable.

EC46) The apparatus of EC43, wherein each of the bands comprises one or more R-blocks.

EC47) The apparatus of EC43, wherein each of the bands comprises one or more blocks of the NVM.

EC48) The apparatus of EC43, wherein each of the bands is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC49) The apparatus of EC43, further comprising recycler hardware logic circuitry enabled to recycle data from a first one of the bands to a second one of the bands, and wherein the second band contains both data written directly by the host and data recycled from the first band.

EC50) The apparatus of EC43, further comprising a counter associated with a Logical Block Address (LBA) corresponding to the write and wherein the characteristic is based at least in part on the counter.

EC51) The apparatus of EC50, wherein the counter is enabled to count a number of writes to the LBA.

EC52) The apparatus of EC50, wherein the counter is enabled to count a difference between a number of reads of the LBA and a number of writes of the LBA.

EC53) The apparatus of EC43, further comprising a storage interface compatible with one or more storage interface standards and wherein the write is received from the host via the storage interface.

EC54) The apparatus of EC43, wherein the memory write hardware logic circuitry comprises a flash memory interface enabled to communicate with the NVM.

EC55) The apparatus of EC43, wherein the NVM comprises at least one flash memory.

EC56) The apparatus of EC43, wherein the apparatus is comprised in a controller implemented in a single integrated circuit.

EC57) A method comprising:
determining at least some characteristics of write data;
selecting one of a plurality of managed groups of blocks of one or more Non-Volatile Memories (NVMs) based at least in part on the characteristics;
writing the write data to the selected managed group;
wherein the determining, the selecting, and the writing are performed by a controller of a storage system; and
wherein each of the managed groups is managed with respect to one or more management operations, and the management operations comprise any one or more of a recycling operation and a write allocation operation, and each of the managed groups comprises storage provided by at least two die of the NVMs.

EC58) The method of EC57, wherein each of the managed groups corresponds to a respective management scheme of the NVMs.

EC59) The method of EC58, wherein the respective management schemes are in accordance with respective logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific ECC schemes, being subject to recycling, and being not subject to recycling.

EC60) The method of EC58, wherein the respective management schemes are in accordance with respective physical properties comprising including solely lower-page blocks and including solely upper-page blocks.

EC61) The method of EC58, wherein the respective management schemes are in accordance with respective write data sources comprising a computing host providing host data, data produced by recycling, and data produced by system operations.

EC62) The method of EC57, wherein each of the managed groups comprises one or more R-blocks.

EC63) The method of EC57, wherein each of the managed groups comprises one or more blocks of the NVM.

EC64) The method of EC57, wherein each of the managed groups is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC65) The method of EC57, further comprising recycling data from a first one of the managed groups to a second one of the managed groups, and wherein the second managed group contains both data written directly by the host and data recycled from the first managed group.

EC66) The method of EC57, further comprising receiving the write data from a host.

EC67) The method of EC57, wherein the write data is generated by the controller.

EC68) The method of EC57, wherein the write data comprises any one or more of user write data, rewritten data, system data, rewritten system data, and rewritten user data.

EC69) The method of EC68, wherein the system data comprises checkpoint data.

EC70) The method of EC57, wherein the determining is responsive to a hint.

EC71) The method of EC70, wherein the hint is received from a host.

EC72) The method of EC70, wherein the hint indicates that the write data is any one of read-only data or write-only data.

EC73) The method of EC57, wherein the determining is responsive to analyzing the write data.

EC74) The method of EC73, wherein the analyzing is performed at least in part in any one or more of hardware, software, and firmware.

EC75) The method of EC74, wherein the hardware comprises any one or more of a data reduction engine, a data deduplication engine, and a data compression engine.

EC76) The method of EC57, wherein the determining is performed at least in part via hardware.

EC77) The method of EC76, wherein the hardware comprises a data reduction engine.

EC78) The method of EC76, wherein the characteristics comprise the write data being executable.

EC79) The method of EC76, wherein the characteristics comprise the write data being uncompressible.

EC80) The method of EC76, wherein the characteristics comprise the write data being irreducible.

EC81) The method of EC57, wherein the characteristics comprise any one or more of a number of previous writes, a number of previous reads, a ratio of previous reads to previous writes, an indication the write data is uncompressible, an indication the write data is compressible, an indication the write data is executable, and an indication the write data is non-recoverable.

EC82) The method of EC57, wherein the characteristics comprise any one or more of previously selected ones of the managed groups.

EC83) The method of EC57, wherein any one or more of the managed groups comprises ones of the blocks containing data the determining characterized as one or more of frequently read, frequently written, uncompressible, executable, and non-recoverable.

EC84) The method of EC57, wherein one or more of the managed groups has only ones of the blocks containing any one of system data, user data, and rewritten data.

EC85) The method of EC57, wherein one or more of the managed groups has only ones of the blocks containing any one or two of system data, user data, and/or rewritten data.

EC86) The method of EC57, wherein one or more of the managed groups has one of only lower-page or upper-page ones of the blocks.

EC87) The method of EC57, wherein first and second ones of the managed groups have different error correction.

EC88) The method of EC57, wherein the controller is enabled to interface to a host via at least one storage interface compatible with at least one storage interface standard.

EC89) The method of EC57, wherein the controller is enabled to interface to at least one of the die via at least one flash memory interface.

EC90) The method of EC57, wherein the NVMs comprise at least one flash memory.

EC91) A system comprising:
means for determining at least some characteristics of write data;
means for selecting one of a plurality of managed groups of blocks of one or more Non-Volatile Memories (NVMs) based at least in part on the characteristics;
means for writing the write data to the selected managed group;
wherein the means for determining, the means for selecting, and the means for writing are elements of a controller of a storage system; and
wherein each of the managed groups is managed with respect to one or more management operations, and the management operations comprise any one or more of a recycling operation and a write allocation operation, and each of the managed groups comprises storage provided by at least two die of the NVMs.

EC92) The system of EC91, wherein each of the managed groups corresponds to a respective management scheme of the NVMs.

EC93) The system of EC92, wherein the respective management schemes are in accordance with respective logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific ECC schemes, being subject to recycling, and being not subject to recycling.

EC94) The system of EC92, wherein the respective management schemes are in accordance with respective physical properties comprising including solely lower-page blocks and including solely upper-page blocks.

EC95) The system of EC92, wherein the respective management schemes are in accordance with respective write data sources comprising a computing host providing host data, data produced by recycling, and data produced by system operations.

EC96) The system of EC91, wherein each of the managed groups comprises one or more R-blocks.

EC97) The system of EC91, wherein each of the managed groups comprises one or more blocks of the NVM.

EC98) The system of EC91, wherein each of the managed groups is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC99) The system of EC91, further comprising means for recycling data from a first one of the managed groups to a second one of the managed groups, and wherein the second managed group contains both data written directly by the host and data recycled from the first managed group.

EC100) The system of EC91, further comprising means for receiving the write data from a host.

EC101) The system of EC91, wherein the write data is generated by the controller.

EC102) The system of EC91, wherein the write data comprises any one or more of user write data, rewritten data, system data, rewritten system data, and rewritten user data.

EC103) The system of EC102, wherein the system data comprises checkpoint data.

EC104) The system of EC91, wherein the means for determining is responsive to a hint.

EC105) The system of EC104, wherein the hint is received from a host.

EC106) The system of EC104, wherein the hint indicates that the write data is any one of read-only data or write-only data.

EC107) The system of EC91, wherein the means for determining is responsive to an analysis of the write data.

EC108) The system of EC107, wherein the analysis is performed at least in part in any one or more of hardware, software, and firmware.

EC109) The system of EC108, wherein the hardware comprises any one or more of a data reduction engine, a data deduplication engine, and a data compression engine.

EC110) The system of EC91, wherein the means for determining comprises a data reduction engine.

EC111) The system of EC110, wherein the characteristics comprise the write data being executable.

EC112) The system of EC110, wherein the characteristics comprise the write data being uncompressible.

EC113) The system of EC110, wherein the characteristics comprise the write data being irreducible.

EC114) The system of EC91, wherein the characteristics comprise any one or more of a number of previous writes, a number of previous reads, a ratio of previous reads to previous writes, an indication the write data is uncompressible, an indication the write data is compressible, an indication the write data is executable, and an indication the write data is non-recoverable.

EC115) The system of EC91, wherein the characteristics comprise any one or more of previously selected ones of the managed groups.

EC116) The system of EC91, wherein any one or more of the managed groups comprises ones of the blocks containing data the means for determining characterized as one or more of frequently read, frequently written, uncompressible, executable, and non-recoverable.

EC117) The system of EC91, wherein one or more of the managed groups has only ones of the blocks containing any one of system data, user data, and rewritten data.

EC118) The system of EC91, wherein one or more of the managed groups has only ones of the blocks containing any one or two of system data, user data, and/or rewritten data.

EC119) The system of EC91, wherein one or more of the managed groups has one of only lower-page or upper-page ones of the blocks.

EC120) The system of EC91, wherein first and second ones of the managed groups have different error correction.

EC121) The system of EC91, wherein the controller is enabled to interface to a host via at least one storage interface compatible with at least one storage interface standard.

EC122) The system of EC91, wherein the controller is enabled to interface to at least one of the die via at least one flash memory interface.

EC123) The system of EC91, wherein the NVMs comprise at least one flash memory.

EC124) A tangible computer readable medium having a set of instructions stored therein that when executed by a processing element cause the processing element to perform and/or control actions comprising:
determining at least some characteristics of write data;

selecting one of a plurality of managed groups of blocks of one or more Non-Volatile Memories (NVMs) based at least in part on the characteristics;
writing the write data to the selected managed group;
wherein the processing element is comprised in a controller of a storage system; and
wherein each of the managed groups is managed with respect to one or more management operations, and the management operations comprise any one or more of a recycling operation and a write allocation operation, and each of the managed groups comprises storage provided by at least two die of the NVMs.

EC125) The tangible computer readable medium of EC124, wherein each of the managed groups corresponds to a respective management scheme of the NVMs.

EC126) The tangible computer readable medium of EC125, wherein the respective management schemes are in accordance with respective logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific ECC schemes, being subject to recycling, and being not subject to recycling.

EC127) The tangible computer readable medium of EC125, wherein the respective management schemes are in accordance with respective physical properties comprising including solely lower-page blocks and including solely upper-page blocks.

EC128) The tangible computer readable medium of EC125, wherein the respective management schemes are in accordance with respective write data sources comprising a computing host providing host data, data produced by recycling, and data produced by system operations.

EC129) The tangible computer readable medium of EC124, wherein each of the managed groups comprises one or more R-blocks.

EC130) The tangible computer readable medium of EC124, wherein each of the managed groups comprises one or more blocks of the NVM.

EC131) The tangible computer readable medium of EC124, wherein each of the managed groups is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC132) The tangible computer readable medium of EC124, wherein the actions further comprise recycling data from a first one of the managed groups to a second one of the managed groups, and wherein the second managed group contains both data written directly by the host and data recycled from the first managed group.

EC133) The tangible computer readable medium of EC124, wherein the actions further comprise receiving the write data from a host.

EC134) The tangible computer readable medium of EC124, wherein the write data is generated by the controller.

EC135) The tangible computer readable medium of EC124, wherein the write data comprises any one or more of user write data, rewritten data, system data, rewritten system data, and rewritten user data.

EC136) The tangible computer readable medium of EC135, wherein the system data comprises checkpoint data.

EC137) The tangible computer readable medium of EC124, wherein the determining is responsive to a hint.

EC138) The tangible computer readable medium of EC137, wherein the hint is received from a host.

EC139) The tangible computer readable medium of EC137, wherein the hint indicates that the write data is any one of read-only data or write-only data.

EC140) The tangible computer readable medium of EC124, wherein the determining is responsive to analyzing the write data.

EC141) The tangible computer readable medium of EC140, wherein the analyzing is performed at least in part in conjunction with any one or more of a data reduction engine, a data deduplication engine, and a data compression engine.

EC142) The tangible computer readable medium of EC124, wherein the characteristics comprise any one or more of a number of previous writes, a number of previous reads, a ratio of previous reads to previous writes, an indication the write data is uncompressible, an indication the write data is compressible, an indication the write data is executable, and an indication the write data is non-recoverable.

EC143) The tangible computer readable medium of EC124, wherein the characteristics comprise any one or more of previously selected ones of the managed groups.

EC144) The tangible computer readable medium of EC124, wherein any one or more of the managed groups comprises ones of the blocks containing data the determining characterized as one or more of frequently read, frequently written, uncompressible, executable, and non-recoverable.

EC145) The tangible computer readable medium of EC124, wherein one or more of the managed groups has only ones of the blocks containing any one of system data, user data, and rewritten data.

EC146) The tangible computer readable medium of EC124, wherein one or more of the managed groups has only ones of the blocks containing any one or two of system data, user data, and/or rewritten data.

EC147) The tangible computer readable medium of EC124, wherein one or more of the managed groups has one of only lower-page or upper-page ones of the blocks.

EC148) The tangible computer readable medium of EC124, wherein first and second ones of the managed groups have different error correction.

EC149) The tangible computer readable medium of EC124, wherein the controller is enabled to interface to a host via at least one storage interface compatible with at least one storage interface standard.

EC150) The tangible computer readable medium of EC124, wherein the controller is enabled to interface to at least one of the die via at least one flash memory interface.

EC151) The tangible computer readable medium of EC124, wherein the NVMs comprise at least one flash memory.

EC152) An apparatus comprising:
write data characterizing hardware logic circuitry enabled to determine at least some characteristics of write data;
managed group selection hardware logic circuitry enabled to select one of a plurality of managed groups of blocks of one or more Non-Volatile Memories (NVMs) based at least in part on the characteristics;

memory write hardware logic circuitry enabled to write the write data to the selected managed group;

wherein the apparatus is comprised in a controller of a storage system; and wherein each of the managed groups is managed with respect to one or more management operations, and the management operations comprise any one or more of a recycling operation and a write allocation operation, and each of the managed groups comprises storage provided by at least two die of the NVMs.

EC153) The apparatus of EC152, wherein each of the managed groups corresponds to a respective management scheme of the NVMs.

EC154) The apparatus of EC153, wherein the respective management schemes are in accordance with respective logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific ECC schemes, being subject to recycling, and being not subject to recycling.

EC155) The apparatus of EC153, wherein the respective management schemes are in accordance with respective physical properties comprising including solely lower-page blocks and including solely upper-page blocks.

EC156) The apparatus of EC153, wherein the respective management schemes are in accordance with respective write data sources comprising a computing host providing host data, data produced by recycling, and data produced by system operations.

EC157) The apparatus of EC152, wherein each of the managed groups comprises one or more R-blocks.

EC158) The apparatus of EC152, wherein each of the managed groups comprises one or more blocks of the NVM.

EC159) The apparatus of EC152, wherein each of the managed groups is in accordance with at least one of a plurality of logical properties, the logical properties comprising being frequently read, being relatively more frequently written, being more relatively infrequently written, being uncompressible, being executable, being non-recoverable and necessary to be preserved after a power loss, being recoverable and not necessary to be preserved after a power loss, being encrypted using a specific technique or key, being protected against errors using a specific technique or key or with specific Error-Correcting Code (ECC) schemes, being subject to recycling, and being not subject to recycling.

EC160) The apparatus of EC152, further comprising recycler hardware logic circuitry enabled to recycle data from a first one of the managed groups to a second one of the managed groups, and wherein the second managed group contains both data written directly by the host and data recycled from the first managed group.

EC161) The apparatus of EC152, wherein the write data is received from a host.

EC162) The apparatus of EC152, wherein the write data is generated by the controller.

EC163) The apparatus of EC152, wherein the write data comprises any one or more of user write data, rewritten data, system data, rewritten system data, and rewritten user data.

EC164) The apparatus of EC163, wherein the system data comprises checkpoint data.

EC165) The apparatus of EC152, wherein the write data characterizing hardware logic circuitry is responsive to a hint.

EC166) The apparatus of EC165, wherein the hint is received from a host.

EC167) The apparatus of EC165, wherein the hint indicates that the write data is any one of read-only data or write-only data.

EC168) The apparatus of EC152, wherein the write data characterizing hardware logic circuitry comprises a data reduction engine.

EC169) The apparatus of EC168, wherein the characteristics comprise the write data being executable.

EC170) The apparatus of EC168, wherein the characteristics comprise the write data being uncompressible.

EC171) The apparatus of EC168, wherein the characteristics comprise the write data being irreducible.

EC172) The apparatus of EC152, wherein the characteristics comprise any one or more of a number of previous writes, a number of previous reads, a ratio of previous reads to previous writes, an indication the write data is uncompressible, an indication the write data is compressible, an indication the write data is executable, and an indication the write data is non-recoverable.

EC173) The apparatus of EC152, wherein the characteristics comprise any one or more of previously selected ones of the managed groups.

EC174) The apparatus of EC152, wherein any one or more of the managed groups comprises ones of the blocks containing data the write data characterizing hardware logic circuitry characterized as one or more of frequently read, frequently written, uncompressible, executable, and non-recoverable.

EC175) The apparatus of EC152, wherein one or more of the managed groups has only ones of the blocks containing any one of system data, user data, and rewritten data.

EC176) The apparatus of EC152, wherein one or more of the managed groups has only ones of the blocks containing any one or two of system data, user data, and/or rewritten data.

EC177) The apparatus of EC152, wherein one or more of the managed groups has one of only lower-page or upper-page ones of the blocks.

EC178) The apparatus of EC152, wherein first and second ones of the managed groups have different error correction.

EC179) The apparatus of EC152, further comprising a storage interface comprised in the controller and enabled to interface the controller to a host, and wherein the storage interface is compatible with at least one storage interface standard.

EC180) The apparatus of EC152, further comprising a flash memory interface comprised in the controller and enabled to interface the controller to at least one of the die.

EC181) The apparatus of EC152, wherein the NVMs comprise at least one flash memory.

EC182) Any of the foregoing ECs having or referring to a storage interface standard, wherein the storage interface standard comprises one or more of a Universal Serial Bus (USB) interface standard,
a Compact Flash (CF) interface standard,
a MultiMediaCard (MMC) interface standard,
an embedded MMC (eMMC) interface standard,
a Thunderbolt interface standard,
a UFS interface standard,
a Secure Digital (SD) interface standard,
a Memory Stick interface standard,
an xD-picture card interface standard,
an Integrated Drive Electronics (IDE) interface standard,
a Serial Advanced Technology Attachment (SATA) interface standard,
an external SATA (eSATA) interface standard, a Small Computer System Interface (SCSI) interface standard,
a Serial Attached Small Computer System Interface (SAS) interface standard,
a Fibre Channel interface standard,
an Ethernet interface standard, and
a Peripheral Component Interconnect express (PCIe) interface standard.

EC183) Any of the foregoing ECs having or referring to a flash memory interface, wherein the flash memory interface is compatible with one or more of
an Open NAND Flash Interface (ONFI),
a Toggle-mode interface,
a Double-Data-Rate (DDR) synchronous interface,
a DDR2 synchronous interface;
a synchronous interface, and
an asynchronous interface.

EC184) Any of the foregoing ECs having or referring to a host, wherein the host comprises one or more of
a computer,
a workstation computer,
a server computer,
a storage server,
a Storage Attached Network (SAN),
a Network Attached Storage (NAS) device,
a Direct Attached Storage (DAS) device,
a storage appliance,
a Personal Computer (PC),
a laptop computer,
a notebook computer,
a netbook computer,
a tablet device or computer,
an ultrabook computer,
an electronic reading device (an e-reader),
a Personal Digital Assistant (PDA),
a navigation system,
a (handheld) Global Positioning System (GPS) device,
an automotive control system,
an automotive media control system or computer,
a printer, copier or fax machine or all-in-one device,
a Point Of Sale (POS) device,
a cash-register,
a media player,
a television,
a media recorder,
a Digital Video Recorder (DVR),
a digital camera,
a cellular handset,
a cordless telephone handset, and
an electronic game.

EC185) Any of the foregoing ECs having or referring to at least one flash memory, wherein at least a portion of the at least one flash memory comprises one or more of
NAND flash technology storage cells, and
NOR flash technology storage cells.

EC186) Any of the foregoing ECs having or referring to at least one flash memory, wherein at least a portion of the at least one flash memory comprises one or more of
Single-Level Cell (SLC) flash technology storage cells, and
Multi-Level Cell (MLC) flash technology storage cells.

EC187) Any of the foregoing ECs having or referring to at least one flash memory, wherein at least a portion of the at least one flash memory comprises one or more of
polysilicon technology-based charge storage cells, and
silicon nitride technology-based charge storage cells.

EC188) Any of the foregoing ECs having or referring to at least one flash memory, wherein at least a portion of the at least one flash memory comprises one or more of
two-dimensional technology-based flash memory technology, and
three-dimensional technology-based flash memory technology.

System

In some embodiments, an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level redundancy and/or error correction, higher-level redundancy and/or error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

FIG. 1A illustrates selected details of an embodiment of an SSD including an SSD controller enabled to perform management and region selection of writes to regions of non-volatile memory. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more instances of Flash Device 192 per bus; one or more groups of busses with one or more instances of Flash Device 192 per bus, having busses in a group generally accessed in parallel; or any other organization of one or more instances of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191;

Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
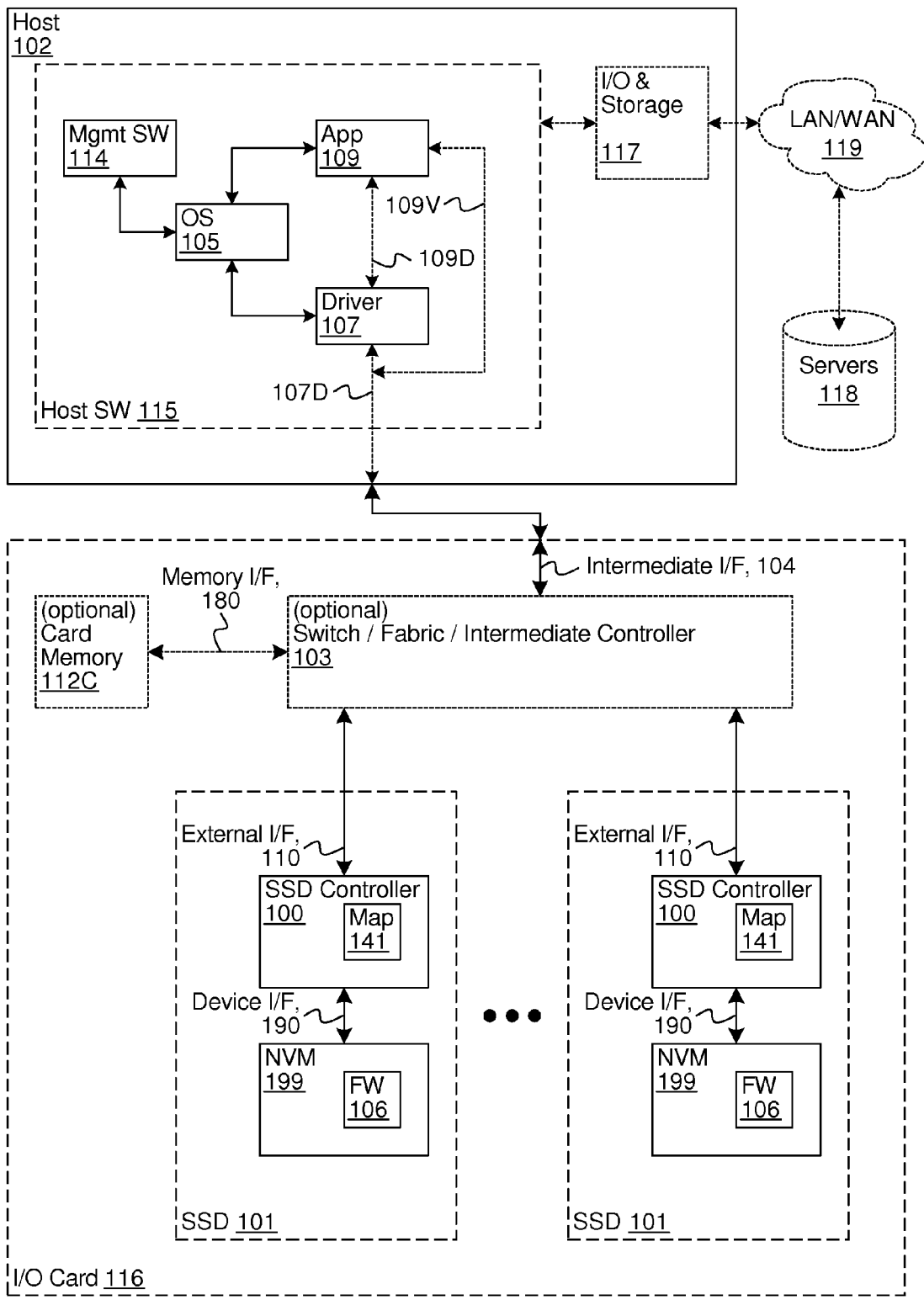
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software ←→ I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application ←→ I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application ←→ I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments with Host 102 as a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Mapping Operation

Figure 2:
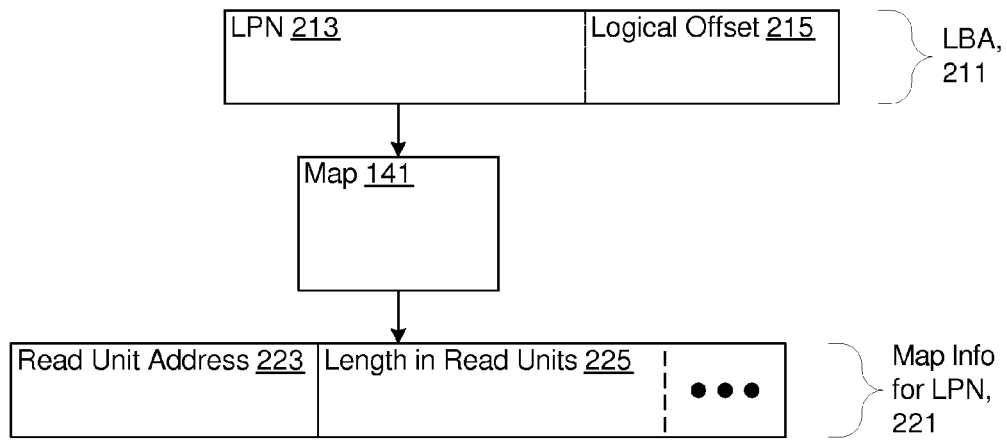
FIG. 2 illustrates selected details of an embodiment of mapping a Logical Page Number (LPN) portion of a Logical Block Address (LBA).

FIG. 2 illustrates selected details of an embodiment of mapping an LPN portion of an LBA. In some embodiments, a read unit is a finest granularity of an NVM that is independently readable, such as a portion of a page of the NVM. In further embodiments, the read unit corresponds to check bits (sometimes-termed redundancy) of a (lower-level) error-correcting code along with all data protected by the check bits. For example, ECC 161 of FIG. 1A implements error correction via check bits such as via an LDPC code, and a read unit corresponds to coding bits implementing the LDPC code in addition to data bits protected by the LDPC coding bits.

In some embodiments, Map 141 maps LPN 213 portion of LBA 211 to Map Info for LPN 221, such as via Table 143 (as illustrated in FIG. 1A). Map info for an LPN (such as Map Info for LPN 221) is sometimes termed a map entry. Map 141 is said to associate an LPN with a corresponding map entry. In various embodiments, mapping is via one or more associative look-ups, via one or more non-associative look-ups, and/or via one or more other techniques.

In some embodiments, SSD Controller 100 maintains one map entry for each LPN potentially and/or actively in use.

In some embodiments, Map Info for LPN 221 includes respective Read Unit Address 223 and Length in Read Units 225. In some embodiments, a length and/or a span are stored encoded, such as by storing the length as an offset from the span, e.g. in all or any portions of Length in Read Units 225. In further embodiments, a first LPN is associated with a first map entry, a second LPN (different from the first LPN, but referring to a logical page of a same size as a logical page referred to by the first LPN) is associated with a second map entry, and the respective length in read units of the first map entry is different from the respective length in read units of the second map entry.

In various embodiments, at a same point in time, a first LPN is associated with a first map entry, a second LPN (different from the first LPN) is associated with a second map entry, and the respective read unit address of the first map entry is the same as the respective read unit address of the second map entry. In further embodiments, data associated with the first LPN and data associated with the second LPN are both stored in a same physical page of a same device in NVM 199.

According to various embodiments, Read Unit Address 223 is associated with one or more of: a starting address in the NVM; an ending address in the NVM; an offset of any of the preceding; and any other techniques for identifying a portion of the NVM associated with LPN 213.

Figure 3:
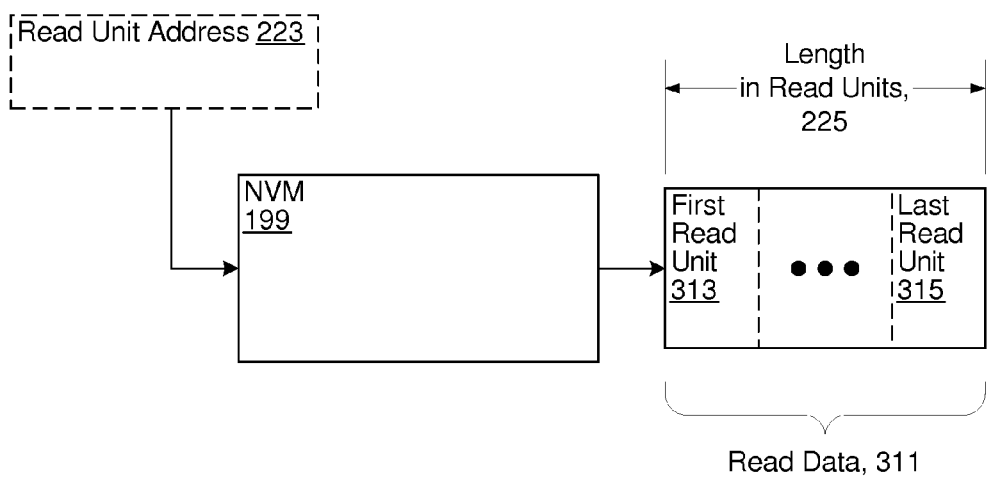
FIG. 3 illustrates selected details of an embodiment of accessing a Non-Volatile Memory (NVM) at a read unit address to produce read data organized as various read units, collectively having a length measured in quanta of read units.

FIG. 3 illustrates selected details of an embodiment of accessing an NVM at a read unit address to produce read data organized as various read units, collectively having a length measured in quanta of read units. According to various embodiments, First Read Unit 313 is one or more of: a one of read units in Read Data 311 with a lowest address in an address space of the NVM; a fixed one of the read units; an arbitrary one of the read units; a variable one of the read units; and a one of the read units selected by any other technique. In various embodiments, SSD Controller 100 is enabled to access NVM 199 and produce Read Data 311 by reading no more than a number of read units specified by Length in Read Units 225.

Figure 4A:
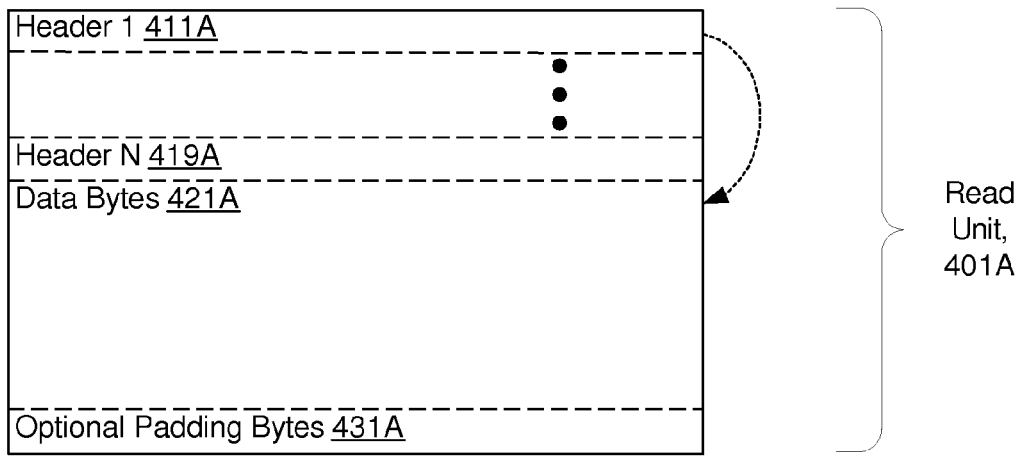
FIG. 4A illustrates selected details of an embodiment of a read unit.

FIG. 4A illustrates selected details of an embodiment of a read unit (such as Read Units 313 or 315 of FIG. 3) as Read Unit 401A. In various embodiments and/or usage scenarios, Header 1 411A through Header N 419A are contiguous, and respective data regions identified (such as via respective offsets) by each of the headers are contiguous following a last one of the headers. The data regions collectively form Data Bytes 421A. The data regions are stored in a location order that matches the location order the headers are stored. For example, consider a first header, at the beginning of a read unit, with a second header and a third header contiguously following the first header. A first data region (identified by a first offset in the first header) contiguously follows the third header. A second data region (identified by a second offset in the second header) contiguously follows the first data region. Similarly, a third data region (identified by the third header) contiguously follows the second data region.

Figure 4B:
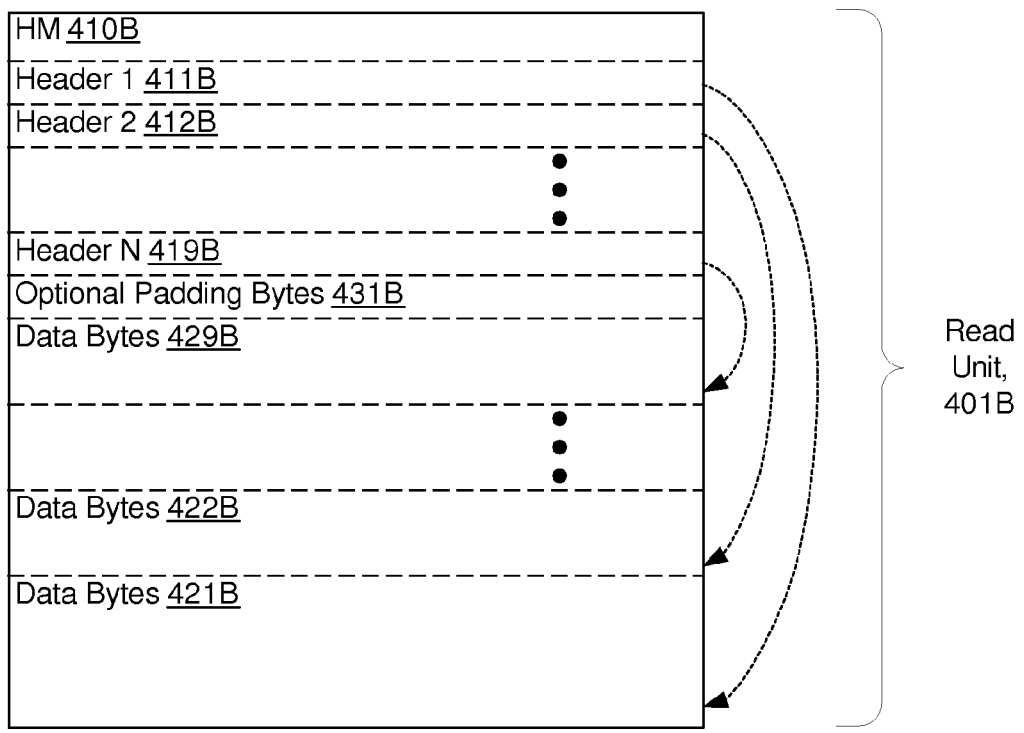
FIG. 4B illustrates selected details of another embodiment of a read unit.

FIG. 4B illustrates selected details of another embodiment of a read unit (such as Read Units 313 or 315 of FIG. 3) as Read Unit 401B. In various embodiments and/or usage scenarios, Header Marker (HM) 410B is an optional initial field (such as a one-byte field) indicating a number of following contiguous headers (Header 1 411B, Header 2 412B . . . Header N 419B). Data regions (Data Bytes 421B, Data Bytes 422B . . . Data Bytes 429B) are identified respectively by the headers (Header 1 411B, Header 2 412B . . . Header N 419B) and are stored in a location order that is opposite of the location order that the headers are stored. Headers start at the beginning of a read unit, while corresponding data regions start at the end of a read unit. In some embodiments, data bytes within a data region (e.g. Data Bytes 421B, Data Bytes 422B . . . Data Bytes 429B) are arranged in a forward order (byte order matching location order), while in other embodiments, the data bytes are arranged in a reverse order (byte order reversed with respect to location order). In some embodiments, a header marker is used in read units where headers and data bytes are stored in a same location order (e.g. as illustrated in FIG. 4A).

In some embodiments, Optional Padding Bytes 431A (or 431B) are according to granularity of data associated with a particular LPN. For example, in some embodiments, if Data Bytes 421A (or collectively Data Bytes 421B, Data Bytes 422B . . . Data Bytes 429B) have less than a fixed amount of remaining space, such as 8 bytes, after storing data associated with all but a last one of Header 1 411A through Header N 419A (or Header 1 411B, Header 2 412B . . . Header N 419B), then data for an LPN associated with the last header starts in a subsequent read unit. In further embodiments, a particular offset value (e.g. all ones) in the last header indicates that the data for the LPN associated with the last header starts in the subsequent read unit.

Figure 5:
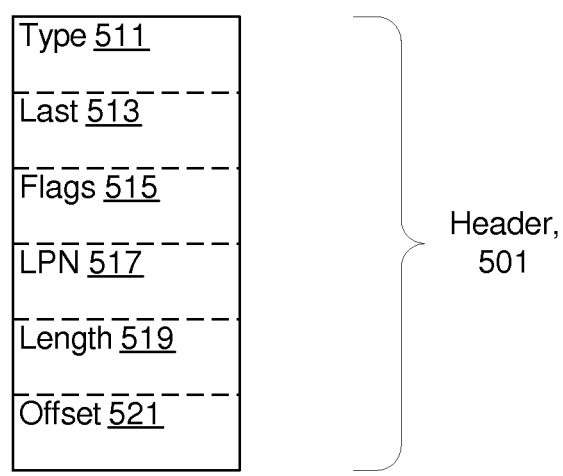
FIG. 5 illustrates selected details of an embodiment of a header having a number of fields.

FIG. 5 illustrates selected details of an embodiment of a header (such as any of Header 1 411A through Header N 419A of FIG. 4A or Header 1 411B through Header 419B of FIG. 4B) having a number of fields. In some embodiments, headers are fixed-length (e.g. each header is a same number of bytes long). Header 501 includes fields Type 511, Last Indicator 513, Flags 515, LPN 517, Length 519, and Offset 521. The type field identifies a category of the data bytes. For example, the type field indicates the category of the data bytes is one of host data (e.g. logical page data) or system data (e.g. map information or checkpoint information). The last field indicates that the header is the last header before the data bytes. In some embodiments with a header marker, the last field is optionally omitted. The LPN field is the LPN that the header is associated with. The LPN field enables parsing of the headers to determine a particular one of the headers that is associated with a particular LPN by, for example, searching the headers for one with an LPN field matching the particular LPN. The length field is the length, in bytes, of the data bytes (e.g. how many bytes of data there are in Data Bytes 421A associated with Header 501). In some embodiments, an offset in the offset field is rounded according to a particular granularity (e.g. 8-byte granularity).

In various embodiments, some or all information associated with a particular LPN is stored in a map entry associated with the particular LPN, a header associated with the particular LPN, or both. For example, in some embodiments, some or all of Length 519 is stored in a map entry rather than in a header.

Figure 6:
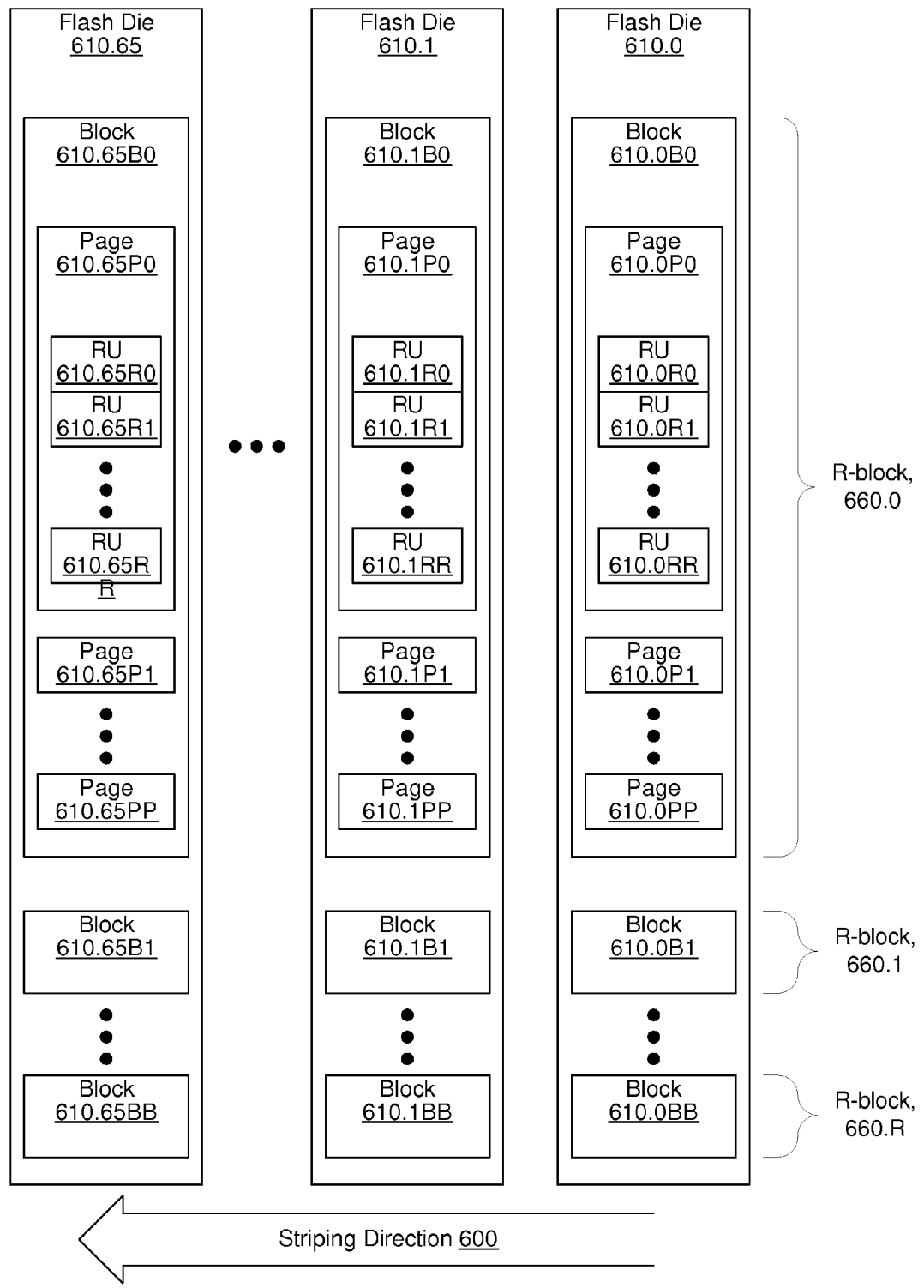
FIG. 6 illustrates selected details of an embodiment of blocks, pages, and read units of multiple NVM devices.

FIG. 6 illustrates selected details of an embodiment of blocks, pages, and read units of multiple NVM devices (e.g. one or more flash die and/or flash chips) managed in logical slices and/or sections. The management functions include any one or more of reading, recycling, erasing, programming/writing, and other management functions. The logical slices and/or sections are sometimes referred to as R-blocks. The figure illustrates an embodiment with 66 flash die. Three of the flash die are explicitly illustrated (Flash Die 610.65, 610.1, and 610.0) and 63 of the flash die are implicitly illustrated (610.64 . . . 610.2).

Each of the flash die (such as any one of Flash Die 610.65 . . . 610.1, and 610.0) provides storage organized as blocks (such as Blocks 610.65BB . . . 610.65B1, and 610.65B0 of Flash Die 610.65; Blocks 610.0BB . . . 610.0B1, and 610.0B0 of Flash Die 610.0; and so forth). The blocks in turn include pages (such as Pages 610.65PP . . . 610.65P1, and 610.65P0 of Block 610.65B0; Pages 610.0PP . . . 610.0P1, and 610.0P0 of Block 610.0B0; and so forth). The pages in turn include read units (such as Read Units 610.65RR . . . 610.65R1, and 610.65R0 of Page 610.65P0; Read Units 610.0RR . . . 610.0R1, and 610.0R0 of Page 610.0P0; and so forth).

In some embodiments, each flash die includes an integer number of blocks (e.g. N blocks) and a block is a smallest quantum of erasing. In some embodiments, each block includes an integer number of pages and a page is a smallest quantum of writing. According to various embodiments, one or more of: a read unit is a smallest quantum of reading and error correction; each page includes an integer number of read units; an associated group of two or more pages includes an integer number of read units; and read units optionally and/or selectively span page boundaries.

In various embodiments, various NVM management functions (e.g. reading, recycling, erasing, and/or programming/writing) are performed in units of R-blocks. An R-block is exemplified as a logical slice or section across various die (e.g. all die, all die excluding ones that are wholly or partially failed, and/or one or more selected subsets of die) of, e.g., a flash memory. For example, in a flash memory having R flash die, each flash die having N blocks, each R-block is the $i^{th}$ block from each of the flash die taken together, for a total of N R-blocks. For another example, in a flash memory having R flash die, each with N blocks, each R-block is the $i^{th}$ and $(i+1)^{th}$ block from each of the flash die, for a total of N/2 R-blocks. For yet another example, in a flash memory having a plurality of dual plane devices, each R-block is the $i^{th}$ even block and the $i^{th}$ odd block from each of the dual plane devices. For a final example, in a flash memory having R flash die, each with N blocks, each R-block is the $i^{th}$ through $(i+k-1)^{th}$ block from each of the flash die, for a total of N/k R-blocks.

In various embodiments with blocks treated in pairs or other associated groups as part of forming an R-block, respective pages from each block of an associated group of the blocks are also treated as a unit, at least for writing, forming a larger multi-block page. For example, continuing the foregoing dual plane example, a first page of a particular one of the even blocks and a first page of an associated one of the odd blocks are treated as a unit for writing, and optionally and/or selectively as a unit for reading. Similarly, a second page of the particular even block and a second page of the associated odd block are treated as a unit. According to various embodiments, a page of NVM as used herein refers to one or more of: a single page of NVM; a multi-block page of NVM; a multi-block page of NVM for writing that is optionally and/or selectively treated as one or more individual pages for reading; and any other grouping or association of pages of NVM.

The figure illustrates a plurality of illustrative R-blocks, three of them explicitly (660.0, 660.1, and 660.R). Each illustrative R-block is the $i^{th}$ block from each of the flash die, taken together. E.g., R-block 660.0 is Block 610.65B0 from Flash Die 610.65, block 0 from Flash Die 610.64 (not explicitly illustrated), and so forth to Block 610.1B0 of Flash Die 610.1, and Block 610.0B0 of Flash Die 610.0. As there are N blocks per flash die, there are thus a total of N R-blocks (R-block 660.R . . . R-block 660.1, and R-block 660.0).

Another example of an R-block is the $i^{th}$ block and the $(i+1)^{th}$ block from each of the flash die, taken together (e.g. Blocks 610.65B0 and 610.65B1 from Flash Die 610.65, blocks 0 and 1 from Flash Die 610.64 (not explicitly illustrated), and so forth to Blocks 610.1B0 and 610.1B1 from Flash Die 610.1, and Blocks 610.0B0 and 610.0B1 from Flash Die 610.0). There are thus N/2 R-blocks, if there are N blocks in each flash die. Yet another example of an R-block is the $i^{th}$ even and odd blocks from each of a plurality of dual plane devices. Other arrangements of flash die blocks for management as R-blocks are contemplated, including mapping between virtual and physical block addresses to ensure that R-blocks have one block from each die, even if some blocks are inoperable. In various embodiments, some of the N blocks in each flash die are used as spares so that the mapping between virtual and physical block addresses has spare (otherwise unused) blocks to replace defective ones of the blocks in the R-blocks.

In various embodiments, reads and/or writes of information in flash die are performed according to an order, such as a 'read unit first' order or a 'page first' order. An example of a read unit first order for read units illustrated in the figure begins with Read Unit 610.0R0 followed by 610.1R0 . . . 610.65R0, 610.0R1, 610.1R1 . . . 610.65R1, and so forth, ending with 610.65RR. An example of a page first order for read units illustrated in the figure begins with Read Unit 610.0R0 followed by 610.0R1 . . . 610.0RR, 610.1R0, 610.1R1 . . . 610.1RR . . . 610.65R0, 610.65R1, and so forth, ending with 610.65RR.

In various embodiments, a writing and/or a striping order of data within an R-block is page (e.g. lowest to highest) first, across all devices (e.g. lowest to highest numbered devices, as suggested conceptually by Striping Direction 600), then the next highest page (across all devices), and so forth, continuing throughout the last page of the R-block. Specifically with respect to R-block 660.0, an example order begins with Page 610.0P0 (the first page in the first block of Flash Die 610.0), followed by Page 610.1P0 (the first page in the first block of Flash Die 610.1), and so forth continuing to Page 610.65P0 (the first page in the first block of Flash Die 610.65, and the last block of R-block 660.0). The example order continues with Page 610.0P1 (the second page in the first block of Flash Die 610.0), followed by Page 610.1P1 (the second page in the first block of Flash Die 610.1), and so forth continuing to Page 610.65P1 (the second page in the first block of Flash Die 610.65). The example continues in an identical order. The example order completes with Page 610.0PP (the last page in the first block of Flash Die 610.0), followed by Page 610.1PP (the last page in the first block of Flash Die 610.1), and so forth ending with Page 610.65PP (the last page in the first block of Flash Die 610.65, and the last page in the last block of R-block 660.0).

In various embodiments, Flash Die 610.65 . . . 610.1, and 610.0 correspond to respective ones of one or more individual Flash Die 194, of FIG. 1A. In some embodiments, Flash Die 610.65 . . . 610.1, and 610.0 are a portion less than all of NVM 199. For example, in various embodiments, data is striped independently across multiple groups of flash die, and each of the groups of flash die is independently accessible.

Band Selection

Figure 7:
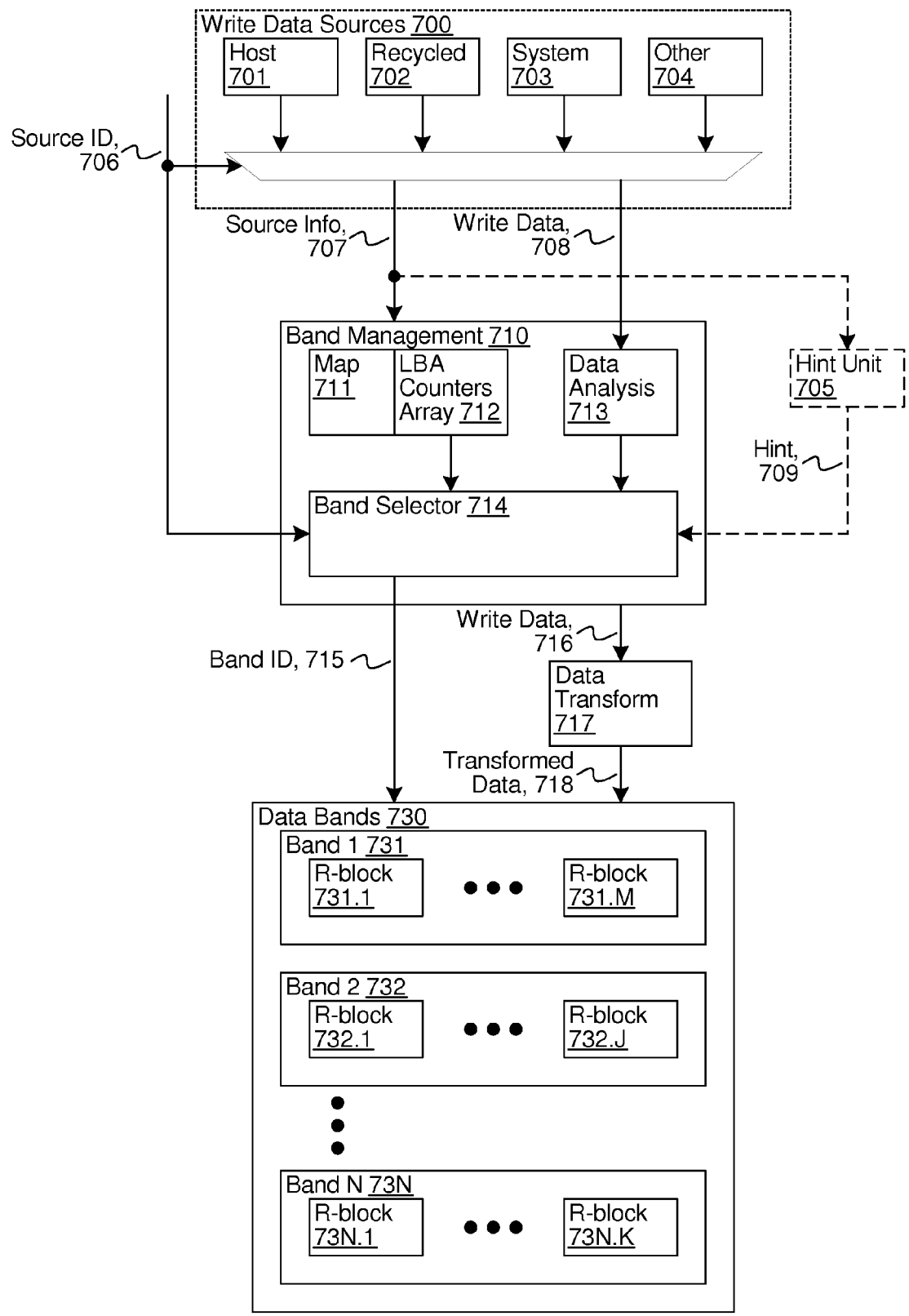
FIG. 7 conceptually illustrates selected details of an embodiment of an SSD that selectively places data into particular bands of NVM of the SSD.

FIG. 7 conceptually illustrates selected details of an embodiment of an SSD that selectively places data into particular bands of NVM of the SSD. Conceptually, writes to the NVMs of the SSD originate from one or more elements of Write Data Sources 700, are analyzed by Band Management 710, transformed by Data Transform 717, and placed into particular Data Bands 730 of the NVMs of the SSD.

In some embodiments, elements of Write Data Sources 700 provide Write Data 708 to the NVM. Examples of elements of Write Data Sources 700 include Host Data 701, Recycled Data 702, System Data 703, and Other Data 704. In some embodiments, Band Management 710 processes some or all elements of the Write Data Sources identically. For example, some embodiments treat the System Data and the Host Data identically. In various embodiments, the Write Data Sources includes elements not listed above. An example of Host Data 701 is data written by a host (e.g. via Host Interface 111 or from host 102). An example of Recycled Data 702 is data that has been rewritten (e.g. by Recycler 151). An example of System Data 703 is data that relates to Map 711. In some embodiments, System Data 703 is generated by SSD Controller 100. Other Data 704 includes data that is not Host Data, not Recycled Data and not System Data.

Source ID 706 controls multiplexer between elements of Write Data Sources and indicates which element provides Write Data 708 and associated Source Info 707. The Source Info is communicated to Band Management 710. Examples of Source Info include an LBA of Write Data, an LBA range of Write Data, the R-block address, and/or which band recycled data was placed in previously (e.g. for the Recycled Data). The Write Data is communicated to Data Analysis 713.

Band Management 710 determines characteristics of the Write Data and the Source Info and selects an appropriate band. In the illustrated embodiment, Band Management 710 includes several modules Map 711, LBA Counters Array 712, Data Analysis 713 and Band Selector 714.

In the illustrated embodiment, the LBA Counters Array tracks characteristics of accesses to LBAs (e.g. a plurality of counters that each respectively track the number of read/write operations to an LBA or group of, for example, contiguous LBAs). Map 711 converts LBAs to block and/or page addresses of the NVM and each map entry is associated with an element of the LBA Counters Array 712. Elements of the LBA Counters Array include one or more counters that each respectively track information about the associated LBA or group of, for example, contiguous LBAs. In various embodiments, each element of LBA Counters Array includes one or more of: reads to the associated LBA, writes to the associated LBA, the ratio of reads to the associated LBA to writes to the associated LBA, consecutive reads to the associated LBA, consecutive writes to the associated LBA, and a counter that is incremented by writes to the associated LBA and decremented by reads to the associated LBA. In some embodiments, the Source Info (e.g., LBA) is used to access the LBA Counters Array and retrieve information about the Write Data from a particular element of the LBA Counters Array.

In the illustrated embodiment, Data Analysis 713 determines characteristics of Write Data 708. As an example, the Data Analysis examines whether a window of the Write Data includes a threshold number of data bytes that appear to be x86 relative branch instructions, thus determining that the Write Data is executable data. In some embodiments, executable data is further transformed, e.g. by converting relative addresses to absolute addresses. As another example, the Data Analysis examines whether the Write Data is uncompressible (e.g. data is in a compressed format such as JPEG, MP3, PDF, MPEG, ZIP, etc. or encrypted data). In some usage scenarios, executable and uncompressible data are read relatively more frequently than written over a particular time interval, and in some embodiments are selectively placed in particular bands. Various embodiments of the Data Analysis include any combination of software, firmware, and/or hardware.

In some embodiments, an optional Hint Unit 705 receives Source Info 707 associated with Write Data and communicates an optional Hint 709 to Band Selector 714. As a first example, the Hint indicates that the Write Data is read-only or read-mostly (e.g. multi-media data, or a read-only table in a database) and is therefore unlikely to be written. As a second example, the Hint indicates that the Write Data is write-only or write-mostly (e.g. a log file or file system journal) and is therefore unlikely to be read. Various embodiments of the Hint Unit include any combination of software, firmware and/or hardware. In various embodiments, the Hint Unit software and/or firmware executes on CPU 171. In various embodiments, the Hint Unit includes a table that associates the Source Info (e.g., LBA, an LBA range) with the Hint. In some embodiments, the Hint Unit operates based at least in part on hint information received from a host (e.g. that provides Host Data 701).

In the illustrated embodiment, based on some combination of the characteristics determined by LBA Counters Array 712, Data Analysis 713, and/or optional Hint 709, and in combination with Source ID 706, Band Selector 714 selects a band for Write Data 708 from Data Bands 730. In some embodiments, the Band Selector selects a band to improve performance, wear leveling, power consumption and/or reliability for the SSD. In some embodiments, the Band Selector selects a hotter band for write data that is determined to be relatively more frequently written (e.g. newly written Host Data, or where the LBA Counters indicate relatively many writes over a particular time interval). The Band Selector selects a colder band for write data that is determined to be less frequently written (e.g. executable or compressed, or where the LBA Counters indicate relatively few writes over a particular time interval, or Recycled Data). In some usage scenarios, recycling will separate out hot and cold data into different bands, because the Band Selector selects colder bands for recycled data, while the Band Selector selects hotter bands for frequently written data. In some embodiments, hints accelerate separating hot and cold data, by indicating that the Write Data (e.g., from Host Data 701) is cold, so that the Band Selector selects a cold band. In some embodiments, blocks containing NVM cells that are likely to have write failures are allocated to the cold band, thus improving reliability. In some embodiments, blocks containing NVM cells that are unlikely to have write failures are allocated to the hot band to improve wear leveling and reliability. In some usage scenarios, the hot band has blocks with more free space, thus enabling more efficient recycling.

In some embodiments, the Band Selector selects an uncompressible band for uncompressible write data. In some embodiments, the Band Selector selects a compressible band for compressible write data. In some embodiments, the Band Selector selects an executable band for executable write data. In some embodiments, the Band Selector will select a hot band for write data that is determined to be write-only (e.g. by the LBA Counters Array or the Hint) and over-ride other factors. In some embodiments, the Band Selector selects a band that is not subject to recycling for write data that is determined to be write-only.

In the illustrated embodiment, Write Data 716 is communicated to Data Transform 717. In various usage scenarios, the Data Transform encrypts and/or compresses the Write Data, and outputs Transformed Data 718. Various embodiments of the Data Analysis are implemented in any combination of software, firmware, and/or hardware. In various embodiments, the Data Transform conceptually occurs prior to, in parallel with, subsequent to, or in combination with the Data Analysis. For example, in some embodiments, processing performed by the Data Transform determines characteristics of the Write Data used by the Data Analysis. In various embodiments, the Data Transform does not transform the Write Data, and the Transformed Data is identical to, or the same as, the Write Data.

The Band Selector communicates Band ID 715 of the selected band to Data Bands 730. The Band ID indicates which of the bands 731, 732 . . . 73N was selected. Each band includes an R-block that is available to receive the Write Data. Transformed Data 718 is sent to the available R-block in the selected band and written into NVM.

In various embodiments, Data Bands 730 as illustrated is conceptual, representing underlying storage as well as associated control functions. As an example, Data Bands 730 includes NVM as well as any combination of hardware, software, and/or firmware to direct Transformed Data 718 to a particular region of the NVM as identified by Band ID 715. In a context of FIG. 1A, for example, the underlying storage corresponds to any portions of NVM 199, and the associated control functions correspond to any portions of any one or more of CPU Core 172, Buffer Management 175, and Scheduling 193.

In various embodiments, one or more of the bands of Data Bands 730 are managed groups of blocks of NVMs (e.g. NVM 199). For example, in the illustrated embodiment, R-blocks 731.1 . . . 731.M are blocks of NVMs and Band 1 731 is a managed group of R-blocks 731.1 . . . 731.M. In various embodiments, R-block 660.0 is an example implementation of R-blocks 731.1 . . . 73N.K.

In various embodiments, bands solely include blocks solely from a specific one of the elements of Write Data Sources 700. In various embodiments, the specific one of the elements of the Write Data Sources is any one of: Host Data 701, Recycled Data 702, System Data 703, and Other Data 704. In respective embodiments, bands include blocks respectively containing solely recycled host data, recycled system data, and recycled host data in combination with recycled system data.

As another example, a band solely includes lower-page blocks of System 703 data. As another example, a band solely includes upper-page blocks that are frequently read. As another example, a band solely includes blocks with System 703 data that are frequently read. As another example, a band solely includes upper-page blocks with System 703 data that are frequently written.

Figure 8:
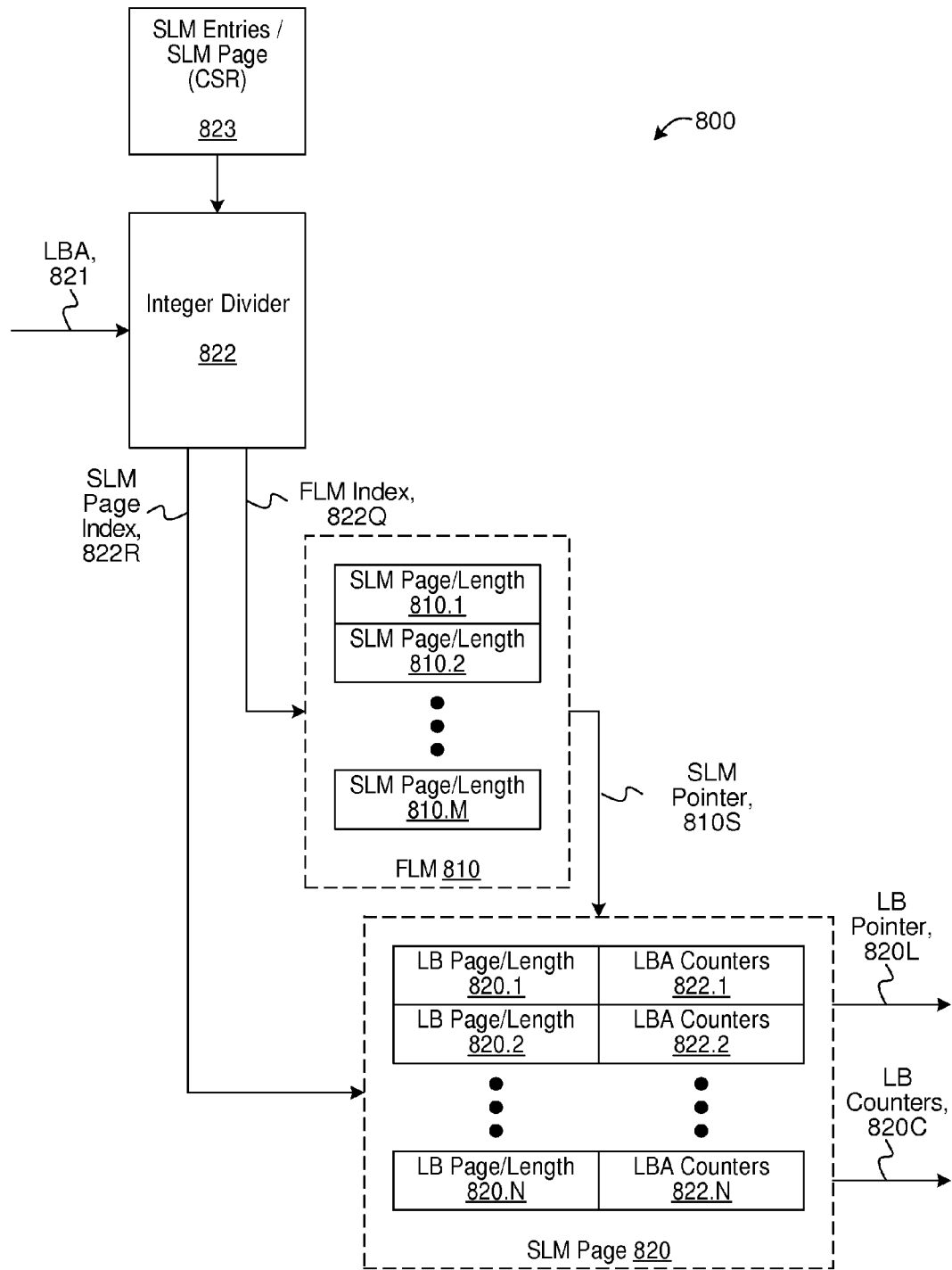
FIG. 8 illustrates selected details of an embodiment of mapping LBAs to Logical Blocks (LBs) stored in an NVM via a two-level map having a First-Level Map (FLM) and one or more Second-Level Map (SLM) pages.

FIG. 8 illustrates, as LBA to NVM Location Mapping 800, selected details of an embodiment of mapping LBAs to LBs stored in an NVM via a two-level map having an FLM and one or more SLM pages. The two-level map is implemented via a first-level element (FLM 810) coupled to one or more second-level elements (illustrated conceptually as a single element SLM Page 820). The FLM includes a plurality of entries (SLM Page/Length 810.1 . . . SLM Page/Length 810.M). Each of the entries of the FLM points to one of the SLM pages (such as SLM Page 820). The SLM page includes a plurality of entries (LB Page/Length 820.1 . . . LB Page/Length 820.N). Each of the entries of the SLM pages points to a location in the NVM where data begins (e.g. a read unit storing at least the beginning of host write data for an LBA).

In various embodiments, the figure is illustrative of selected details of or related to Map 141 and/or Table 143 of FIG. 1A. For example, in some embodiments, Map 141 and/or Table 143 implement one or more caches of mapping information, such as one or more entries of an FLM and/or one or more entries of an SLM. An entire image of the FLM and/or the SLM is maintained in a portion of NVM (e.g., NVM 199 of FIG. 1A), and is updated, e.g., when the caches replace a previously cached one or more FLM and/or SLM entries. In some embodiments, the FLM and/or the SLM entire images are implemented via rolling or ping-pong checkpoints, each of the checkpoints being a portion of the respective entire map image.

In various embodiments, each of the entries of the SLM pages is associated with LBA Counters, so that each LBA 821 is associated with LBA Counters through the LBA to NVM Location Mapping 800. For example, in the illustrated embodiment, LB Page/Length 820.1 is associated with LBA Counters 822.1, LB Page/Length 820.2 is associated with LBA Counters 822.2 and LB Page/Length 820.N is associated with LBA Counters 822.N. In some embodiments LBA Counters are stored in the SLM Page 820; in other embodiments the LBA Counters are stored in a data structure separate from SLM Page 820. In some embodiments, LBA Counters are associated with a range of contiguous LBAs; in other embodiments LBA Counters are associated with a single LBA; in other embodiments, some LBA Counters are associated with a range of contiguous LBAs and other LBA Counters are associated with a single LBA. In some embodiments, the LBA Counters include one or more statistics about the associated LBA. Some examples of statistics are a number of consecutive reads, a number of consecutive writes, a number of reads, a number of writes, a ratio of a number of reads and a number of writes, and a difference between a number of reads and a number of writes. In some embodiments, some or all accesses to an LBA update the respective LBA Counters. In some embodiments, a first access to an LBA will initialize the associated LBA Counters.

A divider (Integer Divider 822) receives a parameter from, e.g., a programmable hardware register (SLM Entries/SLM Page (CSR) 823), to divide an incoming LBA by to determine which FLM entry to select and which SLM entry (within the SLM page pointed to by the selected FLM entry) to select. The divider is coupled to the FLM and the SLM pages.

In operation, LBA 821 is presented to Integer Divider 822. The divider divides the LBA by a number of SLM entries per SLM page, as provided by SLM Entries/SLM Page (CSR) 823, resulting in a quotient (FLM Index 822Q) and a remainder (SLM Page Index 822R). The quotient is used to select one of the FLM entries, and a page field of the selected FLM entry is read (SLM Pointer 810S). The page field is used to select one of the SLM pages (e.g. SLM Page 820), and the remainder is used (e.g. as an offset) to select an entry of the selected SLM page. A page field of the selected SLM page entry is used to select a particular location in the NVM, such as a particular read unit, where at least the beginning of the LB corresponding to the presented LBA is stored (LB Pointer 820L). In various embodiments, the LB pointer includes an address of a read unit of the NVM (e.g. Read Unit Address 223 of FIG. 2). In some embodiments, each of the respective SLM entries includes a field encoding (e.g., length and/or span) associated with data of a respective LB of the respective SLM entry. For example, the span describes how many (contiguous) read units are accessed to obtain all information (uncorrected data and associated error correction check bits) to determine the (error corrected) data of the respective LB. Continuing with the example, the length describes how much of the information read (e.g. in read units, such as illustrated by Length in Read Units 225 of FIG. 2) corresponds to the data of the respective LB. In some embodiments, each of the respective FLM entries includes a field encoding, e.g., length and/or span associated with reading an entirety of a respective SLM page specified by the page field of the FLM entry. For example, the span describes how many (contiguous) read units are accessed to obtain all information (uncorrected data and associated error correction check bits) to determine the (error corrected) data of the respective SLM page. Continuing with the example, the length describes how much of the information read (e.g. in read units, such as illustrated by Length in Read Units 225 of FIG. 2) corresponds to the data of the respective SLM page.

In various embodiments, the quotient is used as a key to access a cache, such as a fully associative cache of SLM pages. If there is a hit in the cache for a particular SLM page, then a latest copy of the particular SLM page is found in the cache without accessing the NVM. Providing fast access to a plurality of SLM pages enables, in some embodiments and/or usage scenarios, more efficient processing of random accesses to NVM and/or a plurality of independent streams of sequential data accesses to NVM (e.g. a first stream of sequential data accesses to a first region of LBAs interspersed with a second stream of sequential data accesses to a second region of LBAs).

Figure 9:
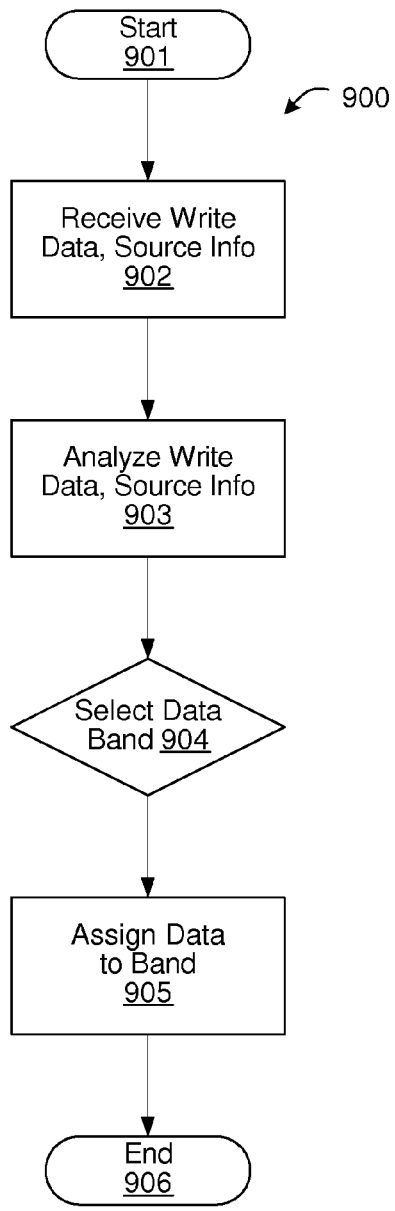
FIG. 9 illustrates a flow diagram of selected details of an embodiment of band management flow of data bands of NVMs (such as in an SSD).

FIG. 9 illustrates a flow diagram of selected details of an embodiment of Band Management Flow 900 of data bands of NVMs (such as in an SSD). Band Management Flow 900 is an example operation of various aspects of band management flow (e.g. processing as performed by Band Management 710 of FIG. 7). The Band Management Flow includes receiving write data (e.g. Write Data 708 of FIG. 7) and source information (e.g. Source Info 707 of FIG. 7) from an element of a plurality of write data sources (e.g. Write Data Sources 700 of FIG. 7). The Band Management Flow further includes selectively placing the write data into the data bands (e.g. Data Bands 730 of FIG. 7).

In response to a write data source providing write data, flow begins (Start 901). The Band Management Flow receives the write data and source information identifying the write data source from the write data source (Receive Write Data, Source Info 902). The Band Management Flow analyzes the write data and the source information to determine characteristics of the write data and characteristics of accesses to the write data (Analyze Write Data, Source Info 903). Based on the determined characteristics, the Band Management Flow selects a band for the write data (Select Data Band 904). The Band Management Flow sends an indicator of the selected band as a band identifier (e.g. Band ID 715 of FIG. 7) to an element having, managing, and or controlling a plurality of data bands (e.g. Data Bands 730 of FIG. 7). The Band Management Flow sends the write data to a data transform element (e.g. Data Transform 717 of FIG. 7), that transforms data and sends the transformed data for writing to the selected data band (Assign Data to Band 905). Flow is then complete (End 906).

In various embodiments, FIG. 7 is illustrative of selected details of or related to FIG. 1A and FIG. 1B. For example, all or any portions of Map 711 and/or LBA Counters Array 712 correspond to all or any portions of Map 141 and/or Table 143. In some embodiments, LBA Counters Array 712 is a portion of Map 141 and/or Table 143; in other embodiments, LBA Counters Array 712 is a data structure that is separate from Map 141.

In some embodiments, portions of Band Management 710 are implemented by portions of SSD Controller 100. For example, Data Analysis 713 and/or Data Transform 717 are implemented in whole or in part, as software and/or firmware executed on CPU 171. For another example, SSD Controller 100 includes hardware used for Data Analysis 713 and/or Data Transform 717.

In various embodiments FIG. 8 is illustrative of selected details of or related to Map 141 and/or Table 143 of FIG. 1A and/or Map 711 and/or LBA Counters Array 712 of FIG. 7. In various embodiments, LBA to NVM Mapping 800 is an implementation of any portions of Map 141 and/or Map 711. In various embodiments, Table 143 is includes multiple FLM 810 and/or SLM pages 820.

Example Implementation Techniques

In some embodiments, various combinations of all or any portions of operations performed by a system, SSD, or SSD controller enabled to perform management and region selection of writes to regions of non-volatile memory (e.g. flash memories), a computing-host flash memory controller, and/ or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
   receiving, from a host, a write command and source information associated with write data of the write command, the source information indicating a Logical Block Address (LBA) corresponding to the write data;
   determining a difference between a number of reads of the LBA and a number of writes of the LBA via a counter corresponding to the LBA;
   selecting one of a plurality of regions of a Non-Volatile Memory (NVM) based at least in part on the determined difference; and
   writing the write data to the selected region, and each of the plurality of regions is a managed portion of the NVM.

2. The method of claim 1, further comprising incrementing the counter when writes to the LBA occur and decrementing the counter when reads to the LBA occur.

3. The method of claim 1, further comprising tracking characteristics of accesses to a set of LBAs, the set of LBAs including the LBA.

4. The method of claim 1, further comprising converting the LBA to an address of the NVM.

5. The method of claim 4, further comprising associating a map entry with the counter.

6. The method of claim 1, further comprising:
   analyzing the write data to determine a characteristic of the write data; and
   selecting the one of the plurality of regions of the NVM based at least in part on the determined characteristic.

7. The method of claim 6, wherein the characteristic is the write data is compressible.

8. The method of claim 1, further comprising:
   receiving an indication from the host the write data is multi-media data; and
   selecting the one of the plurality of regions of the NVM based at least in part on the received indication.

9. A system comprising:
   a band management module configured to:
     receive a write command from a host; and
     receive source information associated with write data of the write command, the source information indicating a logical block address (LBA) corresponding to the write data, the band management module including:
       a logical block address (LBA) counters array with a counter corresponding to the LBA, the counter configured to store a difference between a number of reads of the LBA and a number of writes of the LBA; and
       a band selector configured to select one of a plurality of regions of a non-volatile memory (NVM) based at least in part on the difference; and
   the system configured to store the write data to the selected region.

10. The system of claim 9, further comprising the counter configured to increment a count based on writes to the LBA and decrement the count based on reads of the LBA.

11. The system of claim 9, further comprising the LBA counters array configured to track characteristics of accesses to a set of LBAs, the set of LBAs including the LBA.

12. The system of claim 9, further comprising a map module configured to convert the LBA to an address of the NVM and to provide an association of a map entry with the counter.

13. The system of claim 9, further comprising a data analysis module configured to analyze the write data to determine a characteristic of the write data; and the band selector further configured to select the one of the plurality of regions of the NVM based at least in part on the determined characteristic.

14. The system of claim 13, wherein the characteristic is that the write data is uncompressible.

15. The system of claim 9, further comprising a hint unit configured to receive an indication from the host that the write data includes a log file; and the band selector further configured to select the one of the plurality of regions of the NVM based at least in part on the received indication.

16. A memory device including instructions that when executed by a processor, cause the processor to:
   determine a difference between a number of reads of a storage location associated with a specific logical block address and a number of writes of the storage location via a counter corresponding to the specific logical block address;
   select one of a plurality of regions of a non-volatile memory (NVM) based at least in part on the determined difference; and
   write data intended for the specific logical block address of the storage location to the selected region.

17. The memory device of claim 16 further including instructions that when executed by a processor, cause the processor to increment the counter for each write to the storage location and decrement the counter for each read from the storage location.

18. The memory device of claim 16 further including instructions that when executed by a processor, cause the processor to:
   analyze the data to determine a characteristic of the data; and
   select one of the plurality of regions of the NVM based at least in part on the determined characteristic.

19. The memory device of claim 18, wherein the characteristic is that the data is executable data.

20. The memory device of claim 16 further including instructions that when executed by a processor, cause the processor to:
   receive an indication from a host that the data is read-only data, read-mostly data, write-only data, or write-mostly data; and
   select one of the plurality of regions of the NVM based at least in part on the received indication.

* * * * *